(12) United States Patent
Krablin et al.

(10) Patent No.: US 6,662,354 B1
(45) Date of Patent: Dec. 9, 2003

(54) DETERMINING DESTINATIONS OF A DYNAMIC BRANCH

(75) Inventors: G. Lawrence Krablin, Downingtown; Andrew T. Jennings, West Chester; Timothy N. Fender, Berwyn; William Stratton, Malvern, all of PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/239,282

(22) Filed: Jan. 29, 1999

(51) Int. Cl.[7] .................................................. G06F 9/45
(52) U.S. Cl. ....................... 717/5; 717/7; 717/8; 717/9
(58) Field of Search ............... 717/5, 2, 3, 7, 717/8, 9, 10

(56) References Cited

U.S. PATENT DOCUMENTS

| | | | |
|---|---|---|---|
| 5,396,622 A | * 3/1995 | Lee et al. .................... | 707/7 |
| 5,577,233 A | 11/1996 | Gottelmann et al. ........ | 395/500 |
| 5,724,590 A | 3/1998 | Goettelmann et al. ...... | 395/707 |
| 5,790,825 A | 8/1998 | Traut .......................... | 395/385 |
| 5,815,720 A | 9/1998 | Buzbee ....................... | 395/709 |
| 5,819,064 A | 10/1998 | Razdan et al. .............. | 395/500 |
| 5,832,205 A | 11/1998 | Kelly et al. ............ | 395/185.06 |
| 6,170,081 B1 | * 1/2001 | Fontana et al. ................ | 717/1 |

FOREIGN PATENT DOCUMENTS

| | | |
|---|---|---|
| WO | WO 90/01738 | 2/1990 |
| WO | WO 92/15938 | 9/1992 |

OTHER PUBLICATIONS

Muchnick, "Advanced Compiler Design and Implementation", Morgan Kaufmann Publishers, pp. 293–317, 579–605, 1997.*

Young et al., "A Comparative Analysis of Schemes for Correlated Branch Prediction", ACM, pp. 276–286, Jun. 1995.*

Kaeli et al., "Branch History Table Prediction of Moving Target Branches Due to Subroutine Returns", ACM, pp. 34–42, May 1991.*

Calder et al., "Evidence-Based Static Branch Prediction Using Machine Learning", ACM, pp. 188–222, Jan. 1997.*

* cited by examiner

*Primary Examiner*—Kakali Chaki
*Assistant Examiner*—Ted T. Vo
(74) *Attorney, Agent, or Firm*—Wookcock, Washburn, Kurtz, Mackiewicz & Norris LLP; Mark T. Starr; Lise A. Rode

(57) ABSTRACT

A method, a translator, and a computer-readable medium for translating compiled programming code from a first code state to a second code state are disclosed. The programming code in the first state has a plurality of basic blocks, where each basic block has a set of instructions. At least one basic block ends in a dynamic branch, the dynamic branch being a transfer to one of a set of destinations based on a calculation of a destination address. The plurality of basic blocks in the first state of the programming code are identified, as are links between the identified basic blocks. A control flow graph (CFG) of the programming code is then constructed based on the identified basic blocks and identified links, where the CFG is in a preliminary form. At least one basic block ending in a dynamic branch is identified, and all identified basic blocks that lead to the dynamic branch are explored, based on the CFG, as far back as is necessary to fully determine a set of destination addresses for the dynamic branch. The set of destination addresses defines the set of destinations from the dynamic branch. Such set of destinations is examined to identify a branch table, and the CFG is updated to reflect the set of destinations and the identified branch table. The programming code is then translated from the first state to the second state based at least in part on the updated CFG.

30 Claims, 12 Drawing Sheets

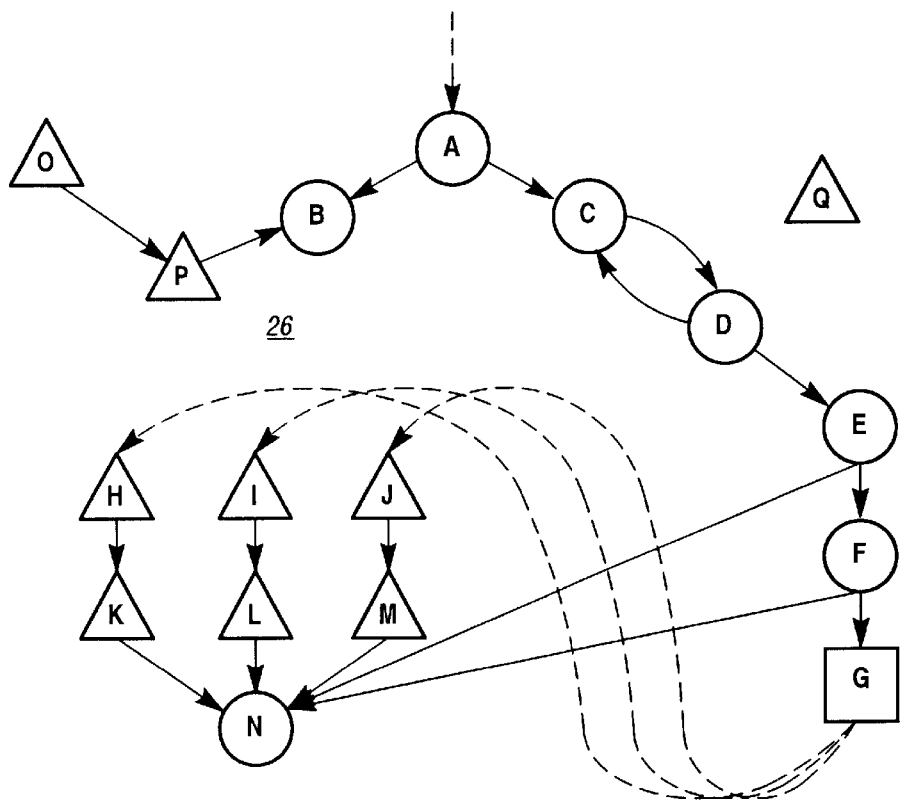
Figure 4
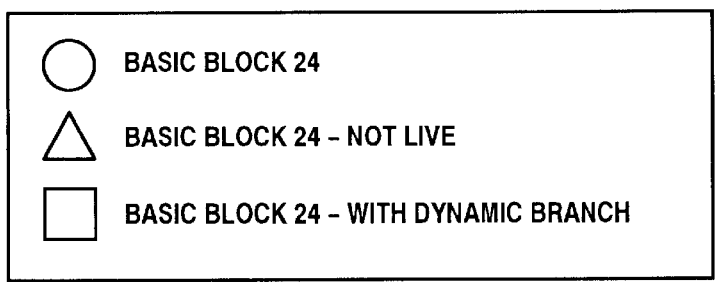
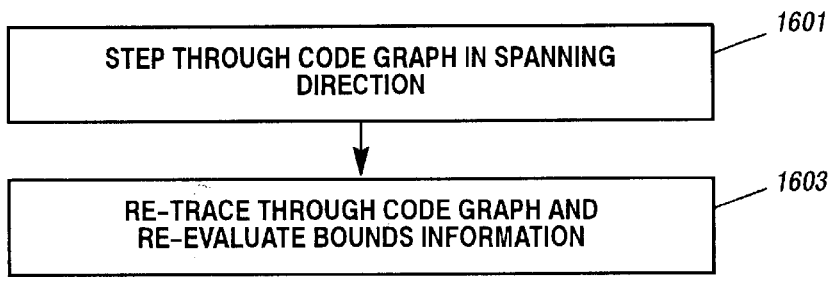
Figure 16

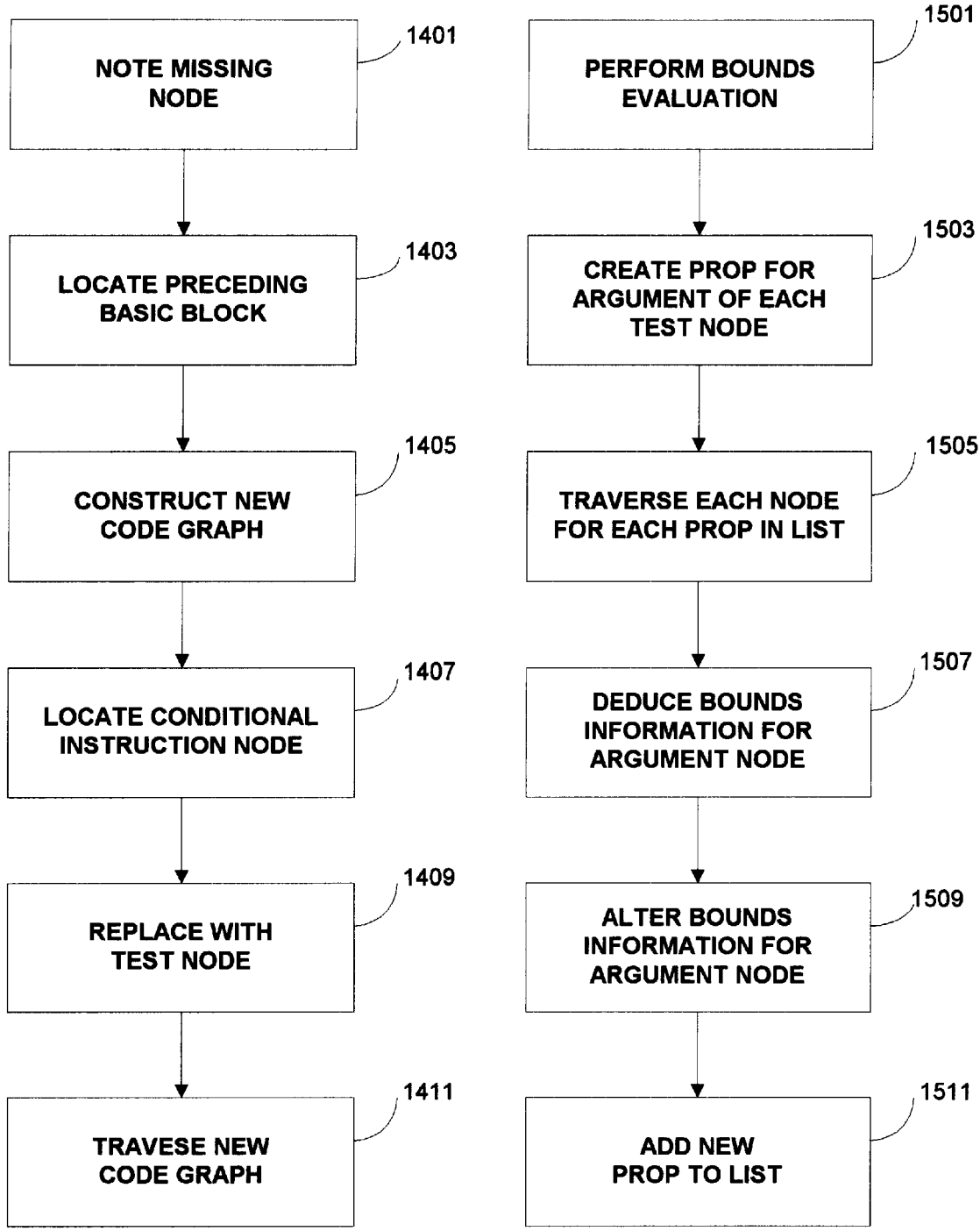

DETERMINING DESTINATIONS OF A DYNAMIC BRANCH

FIELD OF THE INVENTION

The present invention relates to determining destinations of a dynamic branch in compiled computer code (i.e., machine code). More particularly, the present invention relates to determining every possible destination of such a dynamic branch so that the control flow of such computer code with respect to such dynamic branch may be accurately determined.

BACKGROUND OF THE INVENTION

In certain circumstances, it is useful to translate compiled machine code from a first state corresponding to a first instruction set to a second state corresponding to a second instruction set. As is known, such translating is preferable to the alternative: locating the source code from which the machine code in the first code state was derived; and writing and debugging a compiler to compile such located source code directly into the machine code in the second code state.

As is also known, such translating from the first code state to the second code state is performed by way of an appropriate re-compiler or translator on an appropriate processor with attached memory. However, a problem arises in the situation where the machine code in the first state includes branch or destination address information, where such branch address information would be different for the machine code in the second state, and where explicit address information from the original compiler is absent. The problem is exacerbated when branch address information does not translate in a fairly direct manner.

As is known, in computing in general, a dynamic branch is a transfer from one part of computer code to one of several other parts of computer code based on a potentially complex calculation of a branch or destination address. A translator must accurately determine all possible potential destinations of a dynamic branch in the absence of explicit information from the original compiler so that to control flow with respect to such dynamic branch is accurately translated.

In order to translate code from one instruction set to another, it is necessary to identify the destination of every branch. This is a prerequisite to the generation of a complete control flow graph (CFG) for the code. As should be understood, such CFG is needed for full semantic analysis of the code, and, more narrowly, to allow for adjustment to the branches or their arguments to changed addresses or new address forms in the target (i.e., second) instruction set. For a static branch (i.e., a branch to only one destination), whether code segment based or self-relative, this is a straightforward task, as the address of the destination is encoded in the branch instruction itself. For a dynamic branch, however, the task becomes more complex.

Dynamic branches rely, in whole or in part, on results of calculations made prior to the branch, and thus present a more difficult problem for translation. A dynamic branch naturally implicates a set of potential destination addresses, rather than a single destination. A need exists, then, for a translator that evaluates the calculations that preface the branch, in order to adjust for relocated potential destinations or different addressing structure in the target instruction set.

SUMMARY OF THE INVENTION

The present invention satisfies the aforementioned needs by providing a method, a translator, and a computer-readable medium for translating compiled programming code from a first code state to a second code state. The programming code in the first code state has a plurality of basic blocks, where each basic block has a set of instructions. At least one basic block ends in a dynamic branch, the dynamic branch being a transfer to one of a set of destinations based on a calculation of a destination address.

The plurality of basic blocks in the first code state of the programming code are identified, as are links between the identified basic blocks. A control flow graph/representation (CFG) of the programming code is then constructed based on the identified basic blocks and identified links, where the CFG is in a preliminary form. At least one basic block ending in a dynamic branch is identified, and all identified basic blocks that lead to the dynamic branch are explored, based on the CFG, as far back as is necessary to fully determine a set of destination addresses for the dynamic branch.

The set of destination addresses defines the set of destinations from the dynamic branch. Such set of destinations is examined to identify a branch table, and the CFG is updated to reflect the set of destinations and the identified branch table. The programming code is then translated from the first code state to the second code state based at least in part on the updated CFG.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 4 is a diagram showing a control flow graph (CFG) constructed by the translator of FIG. 1 for a particular code segment;

FIGS. 14–16 are additional flow diagrams showing steps performed by the translator of FIG. 1 in analyzing a dynamic branch.

DETAILED DESCRIPTION OF PREFERRED EMBODIMENTS

Figure 1:
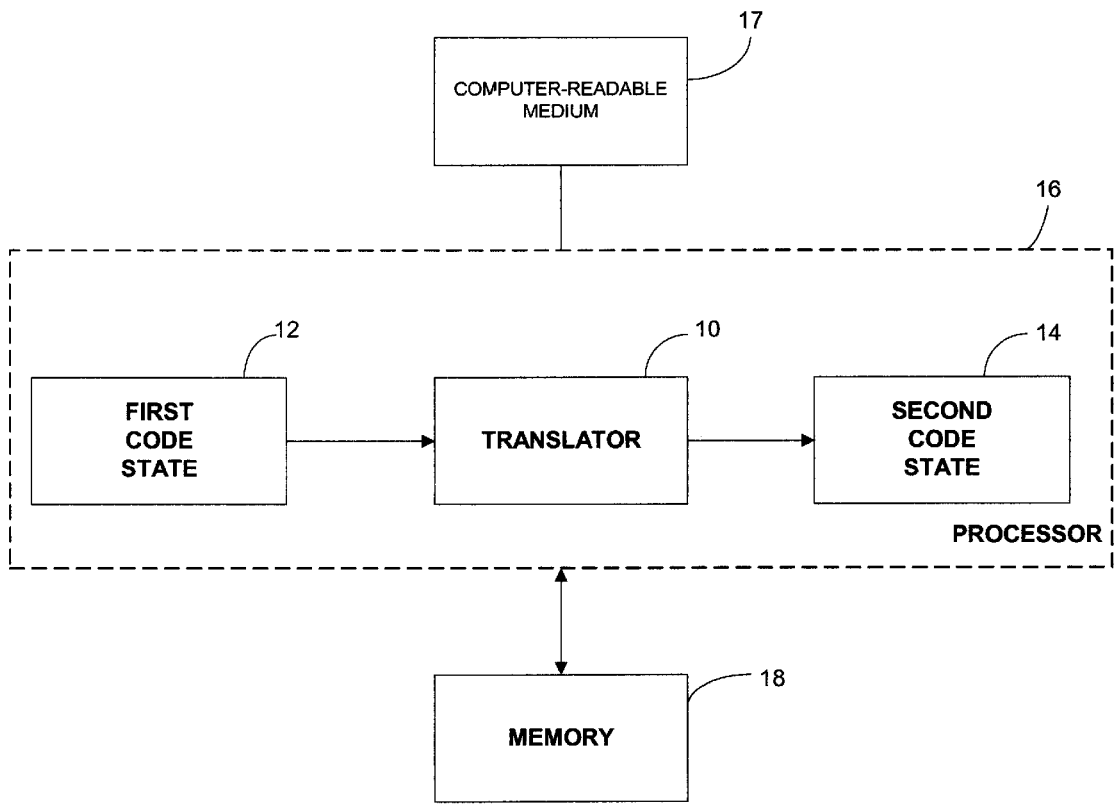
FIG. 1 is a block diagram showing a translator in accordance with the present invention operating on a processor and translating a program from a first state to a second state.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

In the present disclosure, particular reference is made to the E-Mode machine code instruction set, which is produced by compilers for use in connection with certain computers manufactured and sold by UNISYS Corporation of Blue Bell, Pa. However, the present invention is not limited to such E-mode instruction set, and may in fact be employed with any appropriate instruction set (with appropriate modifications) without departing from the spirit and scope of the present invention.

DYNAMIC BRANCHING

E-Mode has three dynamic branch instructions, one unconditional (DBUN), the other two conditional (DBFL & DBTR). All take a top-of-stack argument as the destination. The conditionals take an additional stack argument as a Boolean indication of whether the branch is to be taken or fallen through. Except where specifically relevant to the methods being described, no further distinction will be made between the conditional and unconditional forms. The destination argument to a dynamic branch may take one of two forms: a Program Control Word (PCW) or a reference to a PCW, or an operand. A PCW contains a code address including a segment identification. An operand is interpreted as an address relative to the same code segment as the branch instruction itself.

One common usage of the operand form is to branch into a branch table. As is known, a branch table is generated during compiling of source code into an E-Mode program to implement a SWITCH or CASE statement. For example, based on the following source code:

SWITCH x
CASE 0:
—
  break
CASE 1:
—
  break
CASE 2:
—
  break
CASE 3:
—
  break
. . .
CASE n:
—
  break
default:
the following E-Mode program may be generated:

| | |
|---|---|
| VALC x | (place value x on stack) |
| <perform some sort of bounds checking on x> | |
| <perform some sort of offset calculation and place resulting offset value on stack> | |
| ADD | (add offset value on stack and x on stack and place address |

-continued

| | |
|---|---|
| | result on stack) |
| DBUN | (branch to address on stack) |

In the code, the index x is bounds-checked, adjusted to the location of the branch table, and used as the address argument to a dynamic branch DBUN.

In addition to such code, the following branch table may be generated, each of whose entries is an unconditional static branch to a destination corresponding to a particular case:

BRUN—case 0
BRUN—case 1
BRUN—case 2
BRUN—case 3
. . .
BRUN—case n

As should now be understood, the DBUN instruction dynamically branches to the address of the particular BRUN instruction in the branch table corresponding to the action to be performed based on the value x, and the BRUN instruction further statically branches to code corresponding to the action to be performed based on the value x.

It will be recognized that many variations may be employed in a branch table without departing from the spirit and scope of the present invention. For example, the individual table entries need not be static branches. However, compiler convention is that such an entry must either branch unconditionally elsewhere, leave the procedure, or fault unconditionally. The single exception to such convention is that the last entry in a branch table has no restrictions on it, and is often the code sequence which would have been branched to by that entry. It is also a compiler convention that a branch table is always entered by an operand dynamic branch, never fallen into by a preceding instruction.

The PCW form of dynamic branch takes as its destination argument either the PCW itself, or an indirect reference to the PCW. This form must always be used when the destination of the branch is in a different code segment, even though the address of the destination is fixed. The PCW may be stored in an addressable activation record location and referred to indirectly, constructed directly on the stack (MPCW instruction), or brought to the top of the stack by other means. A PCW is often left in the stack as the return point for a "cheap" procedure call, where the 'exit' instruction is just DBUN.

In some circumstances, dynamic branching is achieved by way of a plain literal code address. In such a situation, the address is either left in the stack or stored in a local activation record cell, and is employed to indicate the state of a loop with multiple parts. The DBUN instruction is then used to iterate to the next element of the loop. Each element then updates the state appropriately for the next iteration. This form may be used by a compiler to implement any 'state machine' construct.

Preliminary Translator Operation

In the present invention, and referring now to FIG. 1, a re-compiler or translator 10 translates compiled machine code from a first state 12 corresponding to a first instruction set to a second state 14 corresponding to a second instruction set. Typically, the translator is operated on a processor 16 with attached memory 18, and the translator 10 is constructed by the processor 16 from a computer-readable medium 17 having computer-executable instructions. Any appropriate processor 16 and memory 18 may be employed without departing from the spirit and scope of the present invention.

In the present disclosure, the E-Mode machine code instruction set is employed as an example of the first instruction set. However, the first instruction set may be any appropriate instruction set without departing from the spirit and scope of the present invention. Likewise, the second instruction set may be any appropriate instruction set without departing from the spirit and scope of the present invention.

Figure 2:
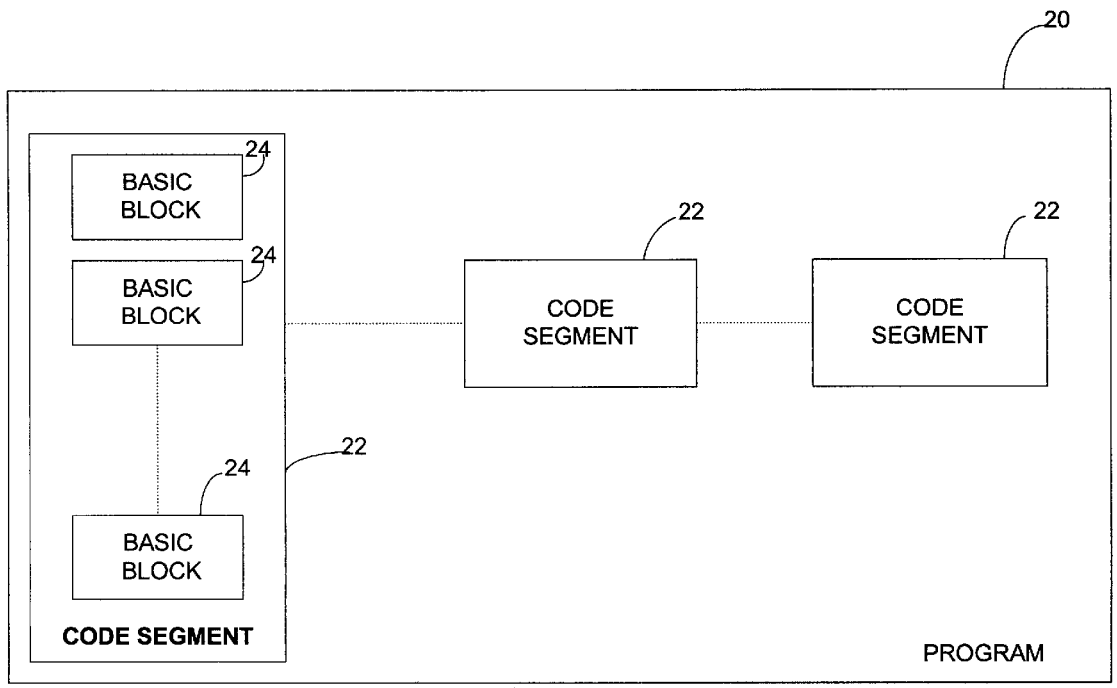
FIG. 2 is a block diagram showing the structure of a typical program as it may appear in the first state of FIG. 1.

Referring now to FIG. 2, an E-Mode program 20 consists of a set of code segments 22. Descriptors for the code segments are contained in a segment dictionary. In the present invention, code analysis is performed by the translator 10 for one code segment 22 at a time, although the generalization to a complete program 20 is straightforward.

A particular code segment 22 may generally be divided into a set of basic blocks 24, where each basic block 24 is a sequence that is entered only at its beginning, be it by a branch, a procedure call, or falling through from a preceding block, and that is exited only through the last instruction in such basic block 24. Thus, any branch must necessarily be the last instruction in a basic block 24. Often, but not always, a basic block 24 is defined as a maximal sequence, but this is not necessary for the purpose of the present invention.

Preferably, in the present invention, the final instruction in a procedure call sequence (ENTR) is treated like a branch, as are certain interrupt causing instructions. This aids in liveness determination (i.e., whether a particular basic block 24 is reachable from any other basic block 24, or whether such particular basic block 24 is 'garbage' arising from the original compilation of the E-Mode program 20, and therefore may be ignored) and clearly marks return points. As a PCW may only be constructed with a MPCW instruction, a scan of an E-Mode program 20 in all code segments 22 will identify basic blocks 24 that may be entered by a procedure call or a PCW dynamic branch. In addition, a scan of such program 20 in all segments 22 is necessary to identify all branches and other structures that would end or begin a basic block 24.

Figure 3:
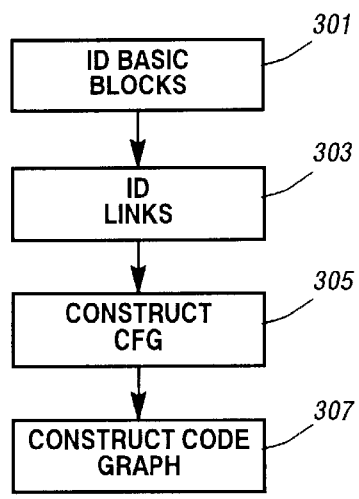
FIG. 3 is a flow diagram showing the preliminary steps performed by the translator of FIG. 1.

In the present invention, then, and referring now to FIG. 3, the translator 10 as a preliminary matter reviews the entire program 20 to locate such PCWs, branches, and other structures, and thereby preliminarily identify all basic blocks 24 in the program 20 (step 301). The translator 10 may then construct an appropriate table or the like to keep track of each identified basic block 24 and information related thereto. Such information may include but is not limited to: liveness/reachability, code address, entrance and exit modes, and a representation of the instructions in the basic block 24. As should be understood, the identification of basic blocks 24 at this stage is preliminary in that some branches and other ending structures may not have been detected. For example, a dynamic branch may have a destination in the middle of what appears to be a single basic block 24, indicating that such seemingly single basic block 24 is in fact a pair (at least) of basic blocks, with the second one of the pair beginning at the aforementioned destination, and the first one ending immediately before. However, when additional basic blocks 24 are detected later, the aforementioned table may be appropriately adjusted/updated.

Once the basic blocks 24 are identified, the translator 10 then begins to identify links between the identified basic blocks 24 in a particular segment 22 (step 303) and construct a preliminary control flow graph or representation (CFG) 26 of the segment 22 based on the identified basic blocks 24 (step 305). Such a CFG 26 is shown in the form of a graph in FIG. 4, although it should be understood that the translator 10 maintains the CFG 26 in a file or table format or the like. In addition, as branch destinations are determined, links are also established from a basic block to branch destinations of such basic block. The established links are the basis for the CFG 26. As should be understood, the CFG 26 is preliminary in that some basic blocks 24 may not have been preliminarily identified, and in that dynamic branch destinations are not as yet identified. However, the CFG 26 may be appropriately adjusted/updated upon obtaining appropriate additional information.

Referring to FIG. 4, a CFG 26 is shown for a segment 22 having sixteen identified blocks 24. As can be seen, the segment 22 is entered at block A, which branches to either block B or block C. Blocks C and D form a circular path, although Block D also leads to block E, which leads to block F, which leads to block G. Blocks E and F also branch to block N. Block G ends with a dynamic branch, and therefore will be analyzed by the translator 10. Preferably, the translator 10 compiles a list of all live blocks 24 having dynamic branches. No links from block G to any other block are presently known, although it will be found that block G leads to blocks H, I, and J, as indicated by the dashed link lines.

Blocks H, I, and J respectively lead to blocks K, L, and M, which all lead to Block N. Block K also leads to block O, which leads to block P, which in turn leads to block B. Blocks H–M, O, and P are marked as being not live because no other block 24 is presently known to branch to blocks H–J, and blocks K–M, O and P are presently known to be reachable only from blocks H–J. Block Q is marked as not live because it is not presently reachable from any other block. Moreover, block Q does not (at least partially) branch to any other block 24 in the segment 22.

Code Graphing

In the present invention, once the translator 10 has fully parsed the program 20 to establish the basic blocks 24 and the CFG 26, and once the translator 10 has compiled a list of all live blocks 24 having dynamic branches, the translator 10 then constructs a code graph or representation 28 (as seen in FIGS. 5–9, e.g.) of the instructions in each block 24 (step 307). Alternatively, since it may be the case that not all blocks 24 need be code-graphed, the translator 10 may construct a code graph 28 for a block 24 on an as-needed basis. As with the CFG 26, the code graphs 28 are shown in the drawings in the form of graphs, although it should be understood that the translator 10 maintains the code graphs 28 in a file or table format or the like. Preferably, each code graph 28 is a rooted directed acyclic graph having interconnected nodes, where such nodes fall into three categories: instruction, inner, and special. All nodes carry some basic information, such as how many stack inputs are required by the node and how many stack items are left by the node.

Referring still to FIGS. 5–9, instruction nodes are leaf nodes, having no departing edges. Each represents an instruction in the original stream of instructions in the block 24. Where an instruction consumes one or more arguments from the stack, it is linked to such arguments by an inner 'apply' node. The apply node has two outgoing edges, one (on the left) to the instruction being applied, and the other (on the right) to the argument(s) being applied to. Most instructions leave zero or one result items on the stack. The apply node, then, represents the application of the instruction to its arguments. Where the result of such an application is then an argument to a following instruction, the apply node may be referred to by the right edge of the apply node for the following instruction. No apply node is needed for instructions which take no arguments from the top of stack.

Many E-Mode instructions take more than one argument from the stack. These arguments are represented in the graph using a 'stack' inner node. A stack node also has two outgoing edges. The left indicates the most recent (topmost) item added to the stack, and the right indicates the remaining items. The left sub-tree of a stack node is never itself a stack sub-tree, while the right sub-tree often is. The term 'item on the stack' is used loosely here, as a stack sub-tree may represent an expression that leaves nothing on the stack.

It is often the case that a basic block 24 will contain an instruction some or all of whose arguments are supplied from (i.e., placed on the stack by) a different basic block. The special 'missing' node is used as a placeholder in the graph for the missing argument. A missing node is a leaf and always indicates a single item on the stack. Each node in a graph contains a count of the number of missing nodes in the sub-tree it heads.

Some E-Mode instructions return multiple items on the stack. In order to allow these results to be individually represented as input arguments to later instructions, the 'alias' inner node acts as a placeholder and indirect reference to one (generally not the topmost) result item of such an instruction. It is an interior node, edged to from a stack node or apply node, and has a single outgoing edge usually leading to the application of the instruction producing the item to which it refers, or sometimes (see below) directly to one of the arguments of such application. An alias node always points to another node in the same code graph 28, and never points to another alias node or a stack node. Such alias node also carries an index indicating which of the results of that instruction is being referred to.

Where an alias node is used to represent an expression involving an instruction with multiple results, the apply node for that instruction is marked as returning only one result. In practice, an apply node will never appear with a result count greater than one. Stack nodes will, however, as the output count associated with a stack node is the total for the sub-tree it heads.

The E-Mode instruction set includes a set of instructions which permute items on top of the stack. These include DUPL: duplicate top of stack, EXCH: exchange two top of stack items, RSDN: rotate top three items down, and RSUP: rotate top three items up. The alias nodes for these instructions point directly to the original item, with an index of one, rather than to the instruction node.

Figure 5:
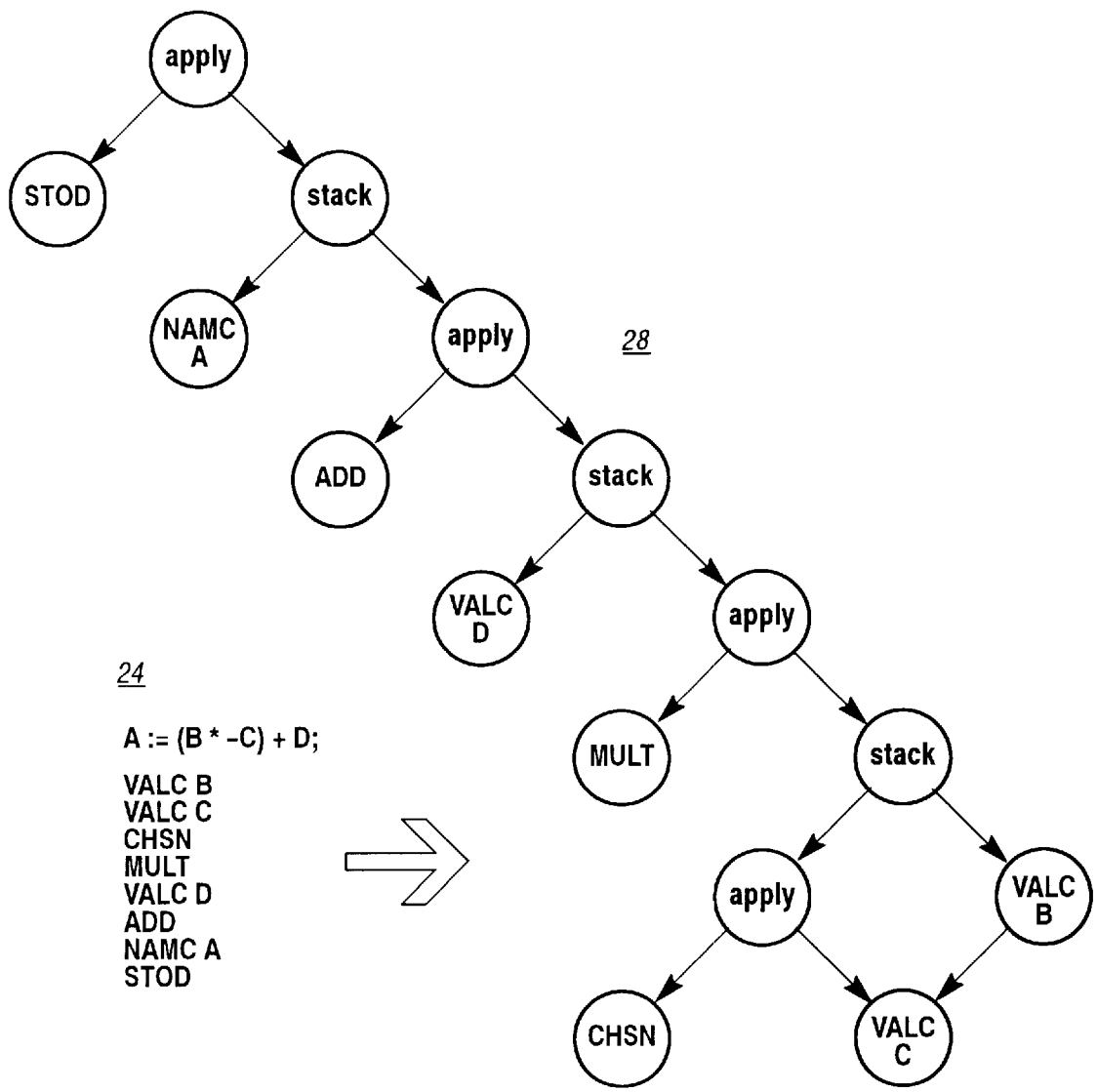
FIGS. 5–9 are diagrams show instances of code graphs constructed by the translator of FIG. 1 for particular basic blocks of code.

In FIG. 5, the code graph 28 shown represents the calculation of a value and the assignment of such value to a variable. The graph 28 shows the relationships among instructions and arguments, as well as how the stack node is used to group multiple arguments. In particular, the code graph 28 represents the source code statement:

A:=(B*−C)+D, which may be represented in the E-Mode instruction set as:

| | |
|---|---|
| VALC B | (place value B on stack) |
| VALC C | (place value C on stack) |
| CHSN | (change sign of top item on stack) |

-continued

| | |
|---|---|
| MULT | (consume top two items on stack and multiply, leave result on stack) |
| VALC D | (place value D on stack) |
| ADD | (consume top two items on stack and add, leave result on stack) |
| NAMC A | (place a reference for location A on stack) |
| STOD | (consume top two items on stack and store result in location indicated) |

As may be appreciated from viewing FIG. 5, in any code graph 28, chronological action generally occurs from bottom to top in a lower right to upper left traversal of the spanning tree (i.e., the tree without any alias nodes and links). However, back tracking analysis performed by the translator 10, as will be discussed below, generally occurs from top to bottom (i.e., in reverse chronological order).

Figure 6:
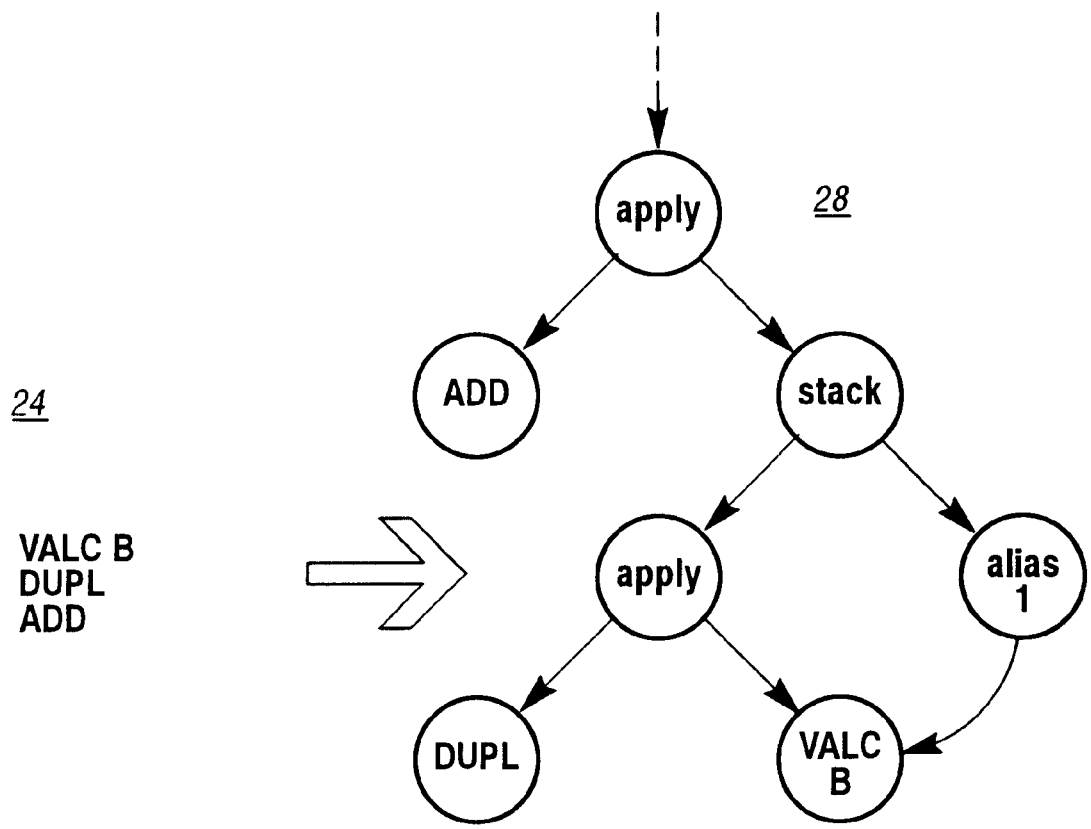

FIG. 6 displays a graph 28 for a block 24, where the graph 28 includes an alias node to represent the effect of a DUPL (duplicate top of stack) instruction. Since DUPL doesn't produce any modification of its argument, the alias refers directly to the VALC node. The application of DUPL itself produces one argument to ADD, while the alias is used to represent the other.

Figure 7:
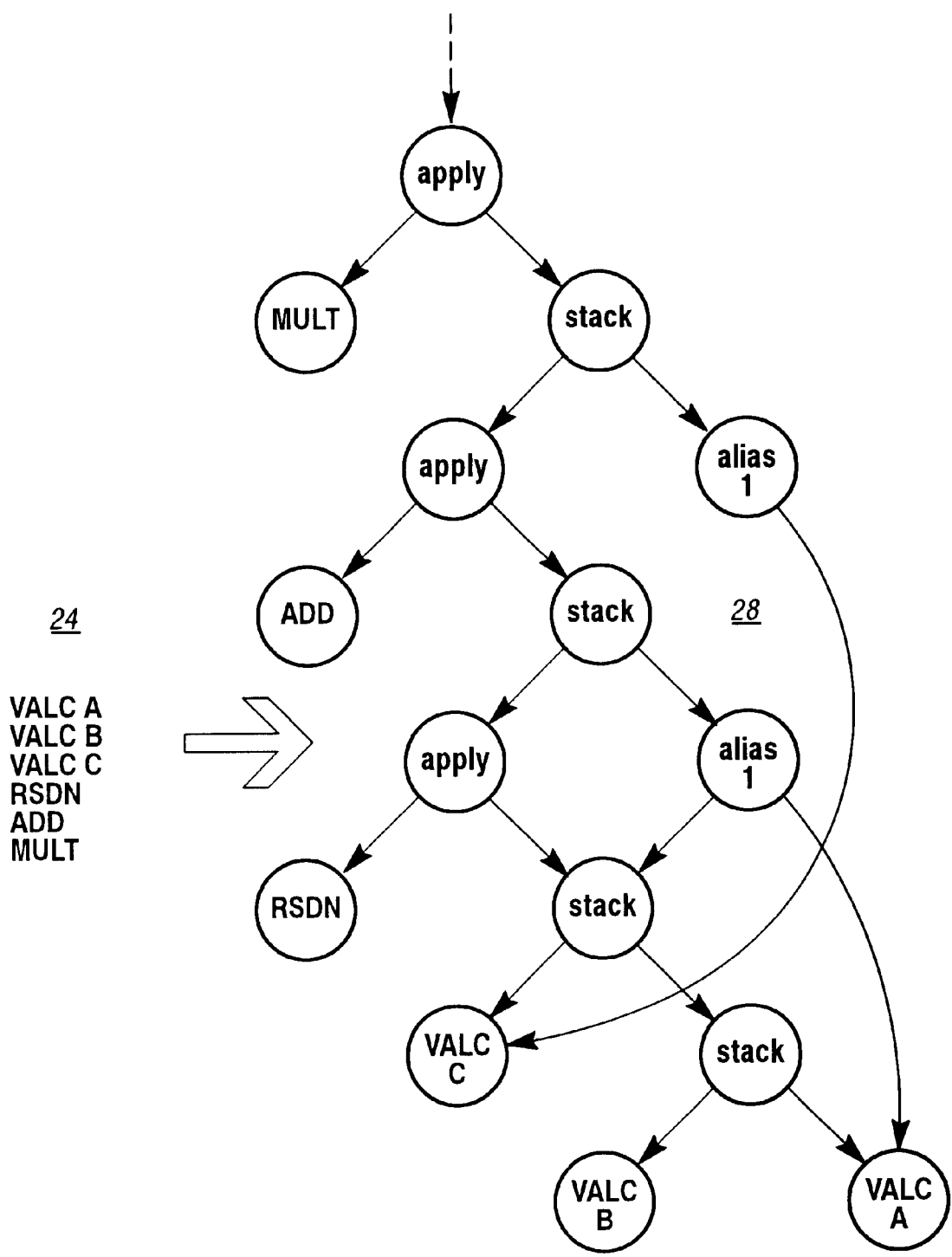

As shown in FIG. 7, two alias nodes are needed to represent the effect of RSDN (rotate stack down), which makes the top of stack item third in the stack and moves the second and third items up to first and second, respectively.

Figure 8:
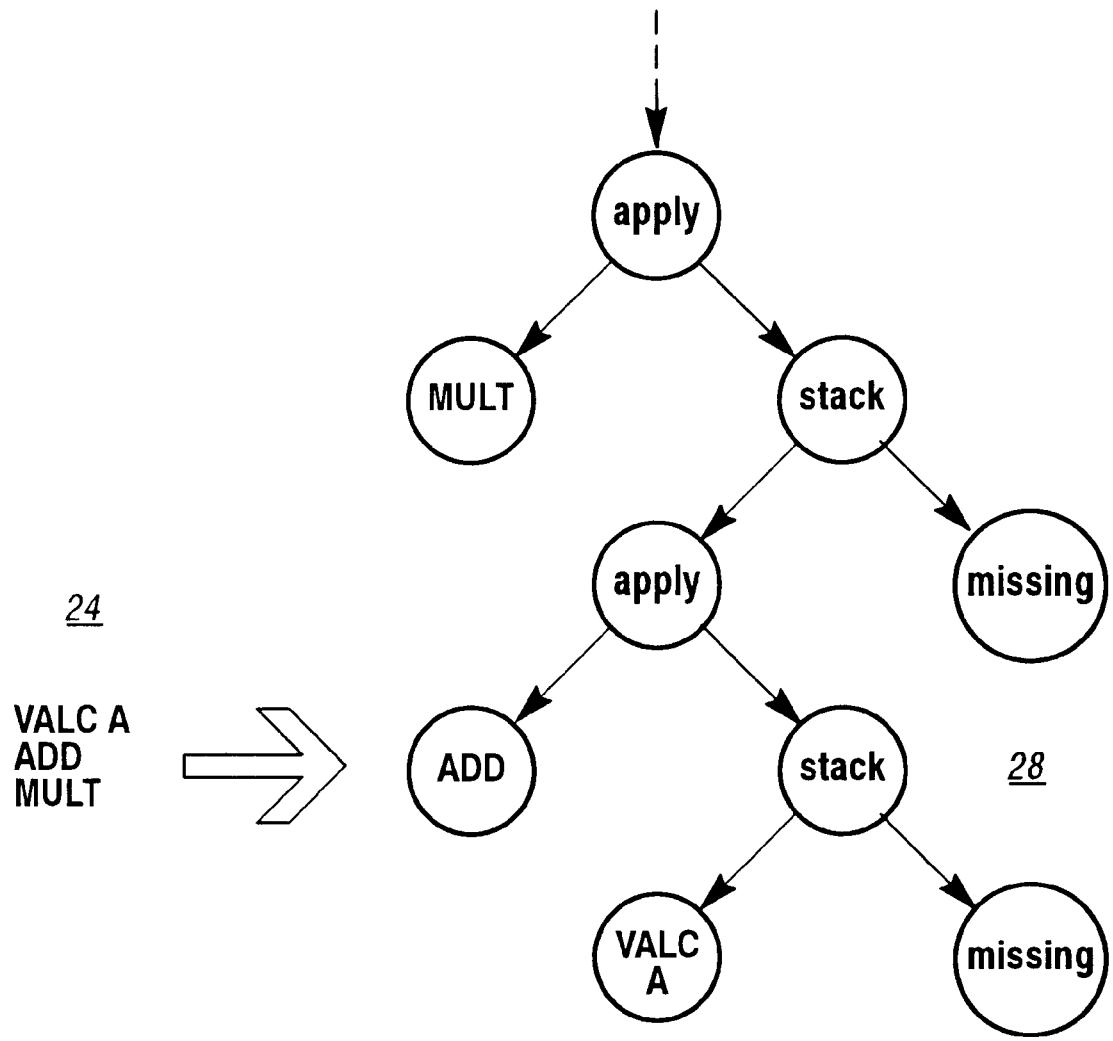

As shown in FIG. 8, when a block 24 contains instructions some of whose arguments are not supplied by such block 24 (i.e., are placed on the stack by another block 24), the graph 28 uses 'missing' nodes to represent the missing arguments. A missing node always has a stack item output count of one.

Figure 9:
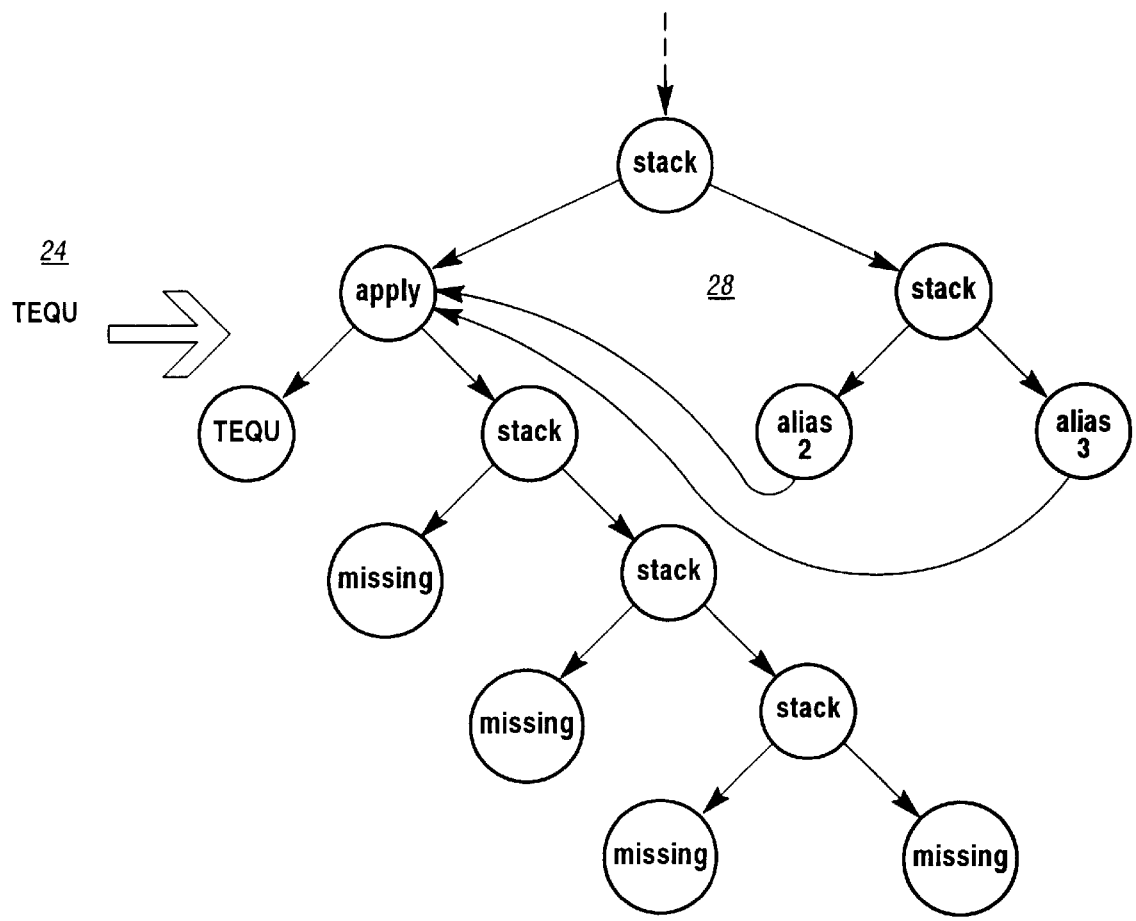

As shown in FIG. 9, the TEQU (transfer while equal update) instruction by itself causes a somewhat extreme combination of missing and alias nodes. As should be understood, such TEQU instruction consumes four stack arguments and leaves three result items on the stack. The items returned are not simply copies of any of the original arguments, so the alias nodes refer to the application of TEQU and contain indices indicating the second and third returned items.

In general, and as can be seen by the numerous examples shown in FIGS. 5–9, based on each instruction in a building block 24 and the effect that such instruction has on the stack, the translator 10 can construct a code graph 28 to represent such block 24 in a relatively straight-forward manner.

Special nodes are generally employed by the translator 10 after such translator 10 has constructed the code graph 28, and include the 'test' nodes. Three types of test nodes are used to represent branches when code graphs 28 from multiple basic blocks 24 are combined to represent the instruction sequence along a path. Such test nodes act as instructions that are applied to a single argument, and are leaf nodes. Test true and test false nodes indicate respectively that the path assumes that the argument yields true or false. The test index node indicates that the argument yields an integer value equal to the index carried with the instruction. The test nodes are used in bounds evaluation, as will be explained in more detail below.

Dynamic Branch Destination Determination

If, in the present invention, the translator 10 is translating a program 20 that was compiled into the E-Mode instruction set, such translator 10 can perform all analysis on a segment 22 by segment 22 basis, rather than all segments 22 concurrently. This is possible with respect to E-Mode because all destinations of an E-Mode static branch or operand dynamic branch are in the same code segment 22 as such branch.

As was discussed above, the translator 10 first establishes the boundaries of the basic blocks 24 (with one exception explained below) (step 301). The translator 10 then establishes the incomplete control flow graph (CFG) 26 representing the effect of static branches (step 305), and transforms the code sequences in each basic block 24 into graphs 28 for further analysis (step 307). For control flow purposes, procedure calls are modeled as terminating a basic block, but falling through to the next. The single exception to this is that so-called "bad goto" ('longjmp' in C) is implemented as a procedure call to an operating system routine that does not return to the calling point. This must be specifically recognized and treated as an unconditional branch, as the compiler that originally produced the program 20, knowing that the stack will be cut back, sometimes leaves such stack in a state which does not match the requirements of the following block 24. The CFG 26 produced by the translator 10 does not model the relationships among blocks 24 caused by procedure calls. That is, there is no edge from a calling block 24 to its target, nor from the target back to the return point. Such modeling is not required because, in practice, such relationships play no part in determining dynamic branch destinations.

As seen in FIG. 4, the CFG 26 is inherently directed, as it represents the dynamic "follows" relation among basic blocks 24. Any block 24 for which there is a PCW is treated as a root. Some basic blocks 24 in the incomplete CFG 26 may not be reachable from some roots or from any roots at all. This arises because of missing connections due to dynamic branches, because multiple procedures may be present in a single code segment 22, and because the compiler that originally produced the program 20 may have been sloppy about eliminating unreachable code.

Within the incomplete CFG 26, blocks 24 that are reachable from a PCW are marked live. Some live blocks 24 may be reachable from not-yet-live (maybe never live) blocks 24. It is possible for the initial translator analysis (step 301) to identify as a single basic block 24 a code sequence that is actually multiple blocks 24. This will eventually be discovered when a (non-branch table) dynamic branch has a destination in the middle of a supposed block 24. Such block 24 must be split into two, and the CFG 26 and other structures adjusted appropriately.

Preferably, the translator 10 analyzes each dynamic branch, but only as it becomes live. This minimizes the need to iteratively analyze all dynamic branches based on newly discovered links in the CFG 26.

Figure 10:
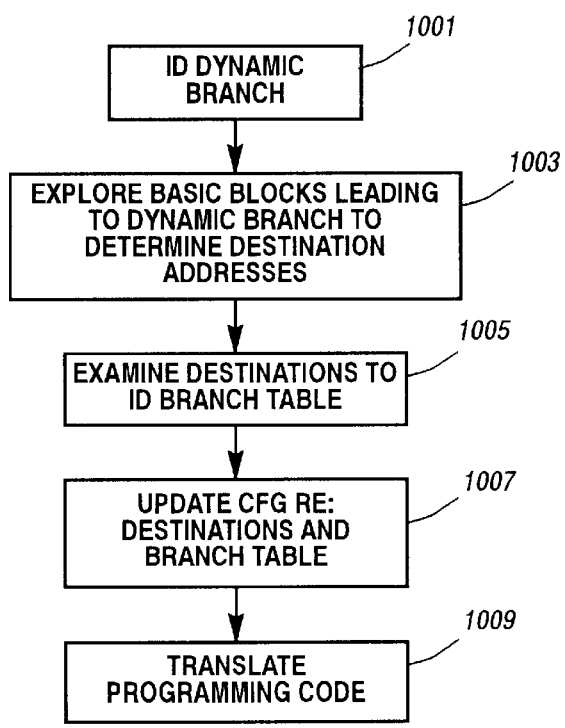
FIG. 10 is a flow diagram showing the steps performed by the translator of FIG. 1 in analyzing a dynamic branch.

Preferably, and referring now to FIG. 10, once a dynamic branch is identified (step 1001), the general method of analysis employed by the translator 10 is to explore all instruction sequences that lead to a dynamic branch as far back as is necessary to fully determine the type of the argument, and, if it is an operand, the range or set of values such operand may take on (step 1003). Once all potential destinations from the dynamic branch are defined, the translator 10 then examines such destinations for validity and to identify a potential branch table (step 1005). Finally, the dynamic branch is replaced in the code graph 28 by a more precise representation of the intended effect, and the CFG 26 is updated to indicate the actual set of destinations, propagating liveness as necessary (step 1007). Accordingly, the translator 10 eventually discovers all destinations associated with the dynamic branch when translating the programming code from the first code state 12 to the second code state 14 (step 1009).

Determining Arguments

The first objective is to determine the type of the argument to the dynamic branch, i.e., operand or PCW. The translator 10 recognizes an operand as being produced by arithmetic instructions or expressions, such as VALC (place value on stack), a 'literal' instruction (which leaves its immediate parameter on the top of stack as an operand), or ADD, or by being explicitly bounds checked with arithmetic comparisons. A dynamic branch argument produced by a NAMC (which generates an indirect reference) will always be a PCW, and any argument that cannot be determined to be an operand is assumed to be a PCW.

There are a number of idioms used by compilers, which somewhat simplifies the analysis process of the translator 10, as the consideration of the complete potential semantics of every possible combination of instructions can be avoided. For example, the preface code to a branch into a branch table always bounds the branch argument, either explicitly or implicitly. This necessity arises out of the fundamental multiprocessing, shared memory nature of E-Mode and other modem instruction sets. Where explicit bounding code for a branch table appears in a block 24, it always immediately precedes the dynamic branch, making it easy to locate and analyze.

There are a number of models for explicit bounding, using various combinations of compares and conditional branches, possibly with logical operations to combine the upper and lower bound test. A different approach is to apply minimum and maximum functions to the argument to place it into a range that exceeds the nominal branch table extent by one place at either end. The branch table is expanded to match, and the extra elements both branch to the 'else' code.

Either or both of the bounds may be inferred from the instructions used to construct the argument. Of particular use are bit field isolate instructions that constrain their results to a small, integer arithmetic range. Other instructions may force the argument to be positive (lower bound of 0), etc. Such knowledge may be employed to dispense with explicit bounds checking altogether. Instead, the branch table may be expanded as necessary to match the actual range of the argument, or to check only the upper or lower bound.

Another idiom example concerns the COBOL PERFORM verb. Such verb is implemented by pushing into the top of the stack a PCW indicating the return point, and an integer which identifies the paragraph which ends the PERFORM range. The first paragraph of the PERFORM range is then branched to, either with a static branch (if the destination is in the same code segment), or the combination of MPCW (Make PCW) and dynamic branch. For purposes of the control flow graph for the code segment, it is important to recognize that this construct behaves like a procedure call, and execution will eventually resume at the instruction following the branch. The exit from a COBOL PERFORM sequence is always a test of the top of stack item to determine if it represents a PERFORM which ends at the current paragraph. If so, that item is deleted and a dynamic branch follows which always expects to find a PCW.

Another idiom example concerns cross segment calls. Specifically, some of the compilers for block structured languages (ALGOL, NEWP) may put the code for an inner block in a separate code segment 22, requiring a PCW dynamic branch for both entry and return. The entry code is two consecutive MPCWs, the first indicating the return point and the second indicating the beginning of the inner block, and a DBUN (dynamic branch unconditional). The return point is always the instruction immediately following the DBUN. Like COBOL PERFORM, it is important to recognize that execution will be resumed eventually at the next instruction. The exit from an inner block in a separate code segment is simply a DBUN whose argument is not provided by code preceding the DBUN in the same code segment 22. Such DBUN expects to find the return PCW left by the entry sequence. The translator 10 must discover that the argument for the DBUN isn't supplied by a basic block in this code segment 22, and therefore must deduce that the present case has arisen.

Another idiom concerns PCW gotos. For cases of either explicitly programmer specified branches to a different code segment, or a compiler generated instance of this, the code will take one of two forms: either NAMC; DBUN or MPCW; DBUN. Both are immediately recognizable as PCW cases, and require no further analysis.

Path Analysis

In performing path analysis, the translator of the present invention treats the incomplete CFG 26 as a directed graph, rooted in the block 24 containing the dynamic branch of interest, and with edges corresponding to the edges in the CFG 26 reversed. The search is depth first, as deep as necessary to find all possible sources of the argument for the dynamic branch of interest. If a back edge is encountered, that path is declared a loop and ignored.

If the path ends without supplying a source, it may be one of two situations. The translator 10 may have encountered a block 24 that is reachable only through a dynamic branch which has not yet been evaluated, or it may have come to a point where the code segment was entered by a PCW dynamic branch from elsewhere. The latter case can be ignored, as it indicates that the current dynamic branch is a segment exit (PCW), and that will be the default. For the former case, it may be necessary to iteratively perform the analysis in order to discover the interaction between multiple dynamic branches.

Once the translator 10 has explored all paths to a dynamic branch of interest, there will be zero or more paths, with type and possibly bounds information attached to each one. If there are none, the translator 10 assumes a segment exit (a PCW was left on the stack when the code segment 22 was entered), and the branch type is PCW. Nothing more need be done with this case, as the PCWs will be translated, and the CFG 26 does not extend across code segments 22 and thus need not be updated. Explicit cases of dynamic branch preceded by either NAMC or MPCW are, of course, a PCW form of dynamic branch.

If all the paths back from a dynamic branch of interest indicate integer bounds where the upper and lower bounds are equal within each path (but are different among the various paths), the source is a literal, and the case is a finite state machine where the state indication is left on the top of stack. The translator 10 will then identify the instructions supplying the literals so that the literal values may be updated during code translation and generation to reflect changed code addresses.

If there is only one path, and its source is a VALC (fetch of an operand from a local variable) with a lower bound check, it is the form of finite state machine where the state indicator is stored in a local temporary. This is an ALGOL idiom. All the stores into that temporary cell in blocks 24 that reach the dynamic branch must be examined by the translator 10, and the literals being stored must be identified as above to be updated. Note that this works because the ALGOL compiler dedicates this stack cell specifically to one particular instance of this construct and uses it for nothing else.

If there is one path and it is fully bounded, a branch table is indicated.

Because of the uncertainty surrounding what may be returned from a procedure call (one result or none on stack), it is possible to have apparent paths indicating both PCW and operand forms. Because procedure calls do not intervene between the source and the dynamic branch for either branch tables or local-variable finite state machines, the choice will be only between explicit PCW and top of stack finite state machine. Preferably, and somewhat heuristically, the translator 10 assumes that the list of constants is the right answer, so this case is taken as a top of stack finite state machine.

Code Graph Generation

A code graph 28 is produced for a basic block 24 by applying each of the instructions of the block 24 in turn to the code graph 28 (serving as the argument to the instruction) resulting from the preceding instructions. The process begins with the first instruction in the basic block 24 and an empty code graph 28, and proceeds through the instructions of the basic block 24 in the order of execution.

Each instruction is examined to determine how many stack inputs it requires. The argument code graph 28 is then de-constructed into separate sub-graphs corresponding to the various items on the stack (produced by the preceding instructions). If there are exactly enough items represented by the argument code graph 28, it is used as the argument directly. If there are more items represented by the argument code graph 28 than are required by the instruction, the required number are used (i.e., from the top of the stack), and the remainder is held aside. If there are fewer items represented by the argument than are required by the instruction, indicating that the arguments will be supplied by instructions in a predecessor basic block 24, enough 'missing' nodes are supplied to address the deficit.

It is important to note that some sub-graphs from the argument code graph 28 may return zero items on the stack. These will be stacked (connected with stack nodes) above the next sub-graph actually returning an item on the stack to form the corresponding argument to the instruction at issue.

If there are multiple arguments required for the instruction at issue, they are stacked in the proper order to form the final argument. If only one stack argument is required, the sub-graph representing such one stack argument is the final argument. In either case, the application code graph 28 is formed by constructing an apply node with the instruction on the left and the argument on the right. If no stack arguments are required, the instruction at issue is itself the result.

If the instruction at issue returns more than one item to the stack, alias nodes are stacked above the apply node as required.

Finally, the remainder from the original code graph 28 (after the required arguments have been extracted), if any, is stacked below the application result to produce the code graph 28 for the instructions processed so far from the beginning of the basic block 24.

When the code graphs 28 for multiple basic blocks 24 along a path are combined to form a single code graph 28, the process is described as application of the code graph 28 representing the successor basic block 24 to the code graph 28 representing the predecessor basic block 24. The process starts as above with an empty argument graph. Then the code graph 28 from each basic block 24 applied in succession, predecessor to successor as described here. The process is similar to that described above. Each code graph 28 is traversed from right to left, corresponding to the order of appearance of the instructions in the basic block 24 from which the code graph 28 was generated. Each instruction encountered in the traversal is applied to the argument graph as above, with some alterations.

When an unconditional branch is encountered, it is simply dropped, as the effect of execution along the path represented by the succession of the two basic blocks 24 involved is as if the basic blocks 24 were adjacent, one falling into the next without a branch. If a conditional branch or dynamic branch is encountered, it is replaced by the appropriate test node, based on how execution would proceed through the branch from the predecessor basic block 24 to the successor basic block 24. Specifically, if a program is assumed to branch from a BRTR (branch on true), the replacing test node is TT (test true). Correspondingly, if the program is assumed to fall through from such BRTR, the replacing test node is TF (test true). Of course, the converse is true from a BRFL (branch on false).

Bounds Evaluation

Preferably, and referring to FIG. 15 now, the translator performs bounds evaluation according to a list of 'props' (step 1501). Each prop indicates a node (the 'target') in the graph to which it applies and a set of bounds that are to be applied to that node. The bounds may include either or both of an upper bound and lower bound.

For each prop on the list, each node in the code graph 28 is traversed (step 1505). Action is taken depending on the kind of node and whether it is the target node indicated by the prop. The code graph 28 is traversed as a right to left traversal of a spanning tree defined on the graph 28 by ignoring alias nodes and links. Note that stack and direct (selector 1) alias nodes are never targets of a prop.

If the node being examined is the target of the prop, then it must be either an apply node (application of an instruction to arguments) or simply an instruction which takes no arguments. The latter case is uninteresting and requires no further action except that the bounds be updated as described below. For an apply node, the edged-to instruction and its arguments are examined to determine if bounds information (in the prop) to be imposed on the apply node can be combined with whatever bounds information may already be available for the arguments. Hopefully, such combination can be used to provide better bounds information for one or more of the arguments (step 1507). For example, an application to an ADD instruction(with some bounds imposed on the result) of a pair of arguments, one of which has some bounds information, can allow some bounds information to be deduced about the other argument. Similarly, for an arithmetic compare instruction, if the result of the compare is known to be true (upper and lower bounds=1), and one of the arguments is a literal or is even a partially bounded expression, some bounds information can be deduced for the other argument. If any new bounds information can be deduced, props containing such bounds information are generated for the argument nodes as needed and added to the list for eventual processing (step 1511). The bounds information for the target node is altered/updated from the prop (step 1509), and the traversal retreats back to the apply node or stack node referring to the target.

If the node being examined is not the target, the action taken depends on the node type. For a stack node the traversal is carried on by examining the left side of the stack node and then the right side. If the node being examined is a direct (selector 1) node and the node indicated by an alias link is the target, bounds information on the alias itself is updated from the prop.

If the node being examined is not the target and it is an apply node, the action taken will depend on the left side of the apply node. If the left side is a test node and this is the initial traversal (there is no prop), a prop is generated for its argument with bounds (upper and lower the same) depending on the test node. A test true will cause bounds of 1, a test false will cause bounds of 0, and a test index will cause bounds equal to the index indicated in the test node. For an apply node, not the target and not applying a test node, the traversal is continued on the argument to the apply node.

In all cases, as the traversal retreats, bounds changes are propagated upward through the graph. That is, if bounds information changes in the argument to an apply node, that information is used in conjunction with the definition of the instruction being applied to update the result (the apply node itself) of the application. If the apply node is also the target of an alias link, a prop is generated for the apply node, so that the alias itself will eventually be updated.

Bounds altering/updating for a node is only allowed to narrow the range (lower the upper bound or raise the lower bound). If the upper and lower bounds conflict as a result (lower>upper), all bounds information for the node is discarded. It is then assumed that such conflicted node will not contribute to overall determination of the destinations of the dynamic branch.

Preferably, the first traversal over the graph 28 takes place with an empty prop, just for the purpose of accumulating props for test nodes (step 1503). Note that normal graph construction will use any bounds information available from arguments to determine initial bounds for instruction application. If a graph contains no test nodes, its construction will have already supplied all the bounds information.

Since the bounds evaluation process is solely for the purpose of determining the potential destinations of a dynamic branch, it is preferable to ignore any instruction that does not contribute to such determination. As should be recognized, there are a set of instructions which compilers use for bounding (compares, conditional branches, etc.) and normalization (addition and subtraction of literals), or that compilers recognize as having inherently bounded results. All others may be ignored.

The instructions with inherently bounded results include the literals, compares (yielding either zero or one), and any other instructions whose result is expressed as a limited number of bits. The bounds information is attached during normal graph construction.

Both normal code graph construction and the upward propagation of bounds information as the graph traversal retreats attempt to deduce useful bounds by examining node arguments, where such bounds are for an application of an instruction to its arguments. This process includes, as a degenerate case, application of an instruction to literal arguments, but applications of this nature are generally also folded down into constants. The useful set of instructions includes ADD/SUBT, MULT, arithmetic compares, AMIN/AMAX, certain bit adjusting instructions, and the logicals.

For any given node, the process must terminate when the bounds converge, since the range is never widened. At this point, analysis of this node will generate no further props. The code graph 28 is finite and fixed, so the overall process will terminate.

Branch Type Determination

When all the potential sources for a particular dynamic branch have been explored, the result is a collection of paths, each with some indication of what kind of source was found. These may be:

- an arithmetic source, fully bounded, as the only path, indicating a branch table;
- a VALC, fully or partially bounded, as the only path, indicating a local variable finite state machine;
- a constant integer value, one of several, indicating a top of stack finite state machine;
- an explicit PCW reference, either NAMC or MPCW, as the only path; or unknown—the path ended without a recognizable source, indicating a cross segment return where the PCW was left on the stack before the segment 22 was branched into.

Because of procedure calls, it is possible to get a mixture of constant integer value, explicit PCW, and unknown cases. Where this occurs, the unknown cases are discarded. If there are constant integer cases, the explicit PCW indications are discarded.

EXAMPLE

Assume the following three blocks 24 flow sequentially in a program 20, where the last block 24 ends in a dynamic branch:

Block 1:

| | |
|---|---|
| VALC A | (get value of a variable A and place on stack) |
| DUPL | (duplicate value on top of stack and place on stack) |
| LT 0 | (place value 0 on stack) |
| LESS | (consume top two values on stack and compare to determine (in effect if A is less than zero), place comparison result on stack) |
| BRTR | (consume top of stack and branch based thereon or else fall through) |

Block 2:

| | |
|---|---|
| DUPL | |
| LT 10 | |
| GRTR | (consume top two values on stack and compare to determine (in effect if A is greater than ten), place comparison result on stack) |
| BRTR | |

Block 3:

| | |
|---|---|
| LT 50 | (place pre-defined offset value 50 on the stack) |
| ADD | (consume top two values on stack and add, place result on stack) |
| DBUN | (consume top of stack and employ as address for dynamic branch) |

Accordingly, in block 1, the value A is tested to see if it is out of bounds at the lower end (i.e., less than zero), and in block 2, the value A is tested to see if it is out of bounds at the upper end (i.e., greater than ten). If out of bounds on either end, the program 20 branches elsewhere; otherwise, the program falls though to block 3, where the value A is offset-by a pre-defined offset value, and the result is employed as the address of a dynamic branch to a branch table not specified here. As should be understood, blocks 1–3 roughly correspond to blocks E, F, and G in FIG. 4.

Figure 11A:
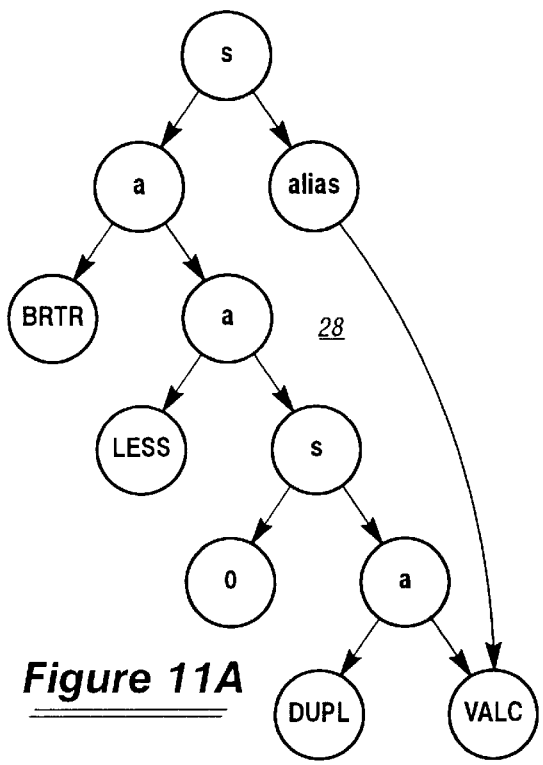
FIGS. 11A–11C are diagrams showing code graphs constructed by the translator of FIG. 1 for three related blocks of code that are to be analyzed.
Figure 11C:
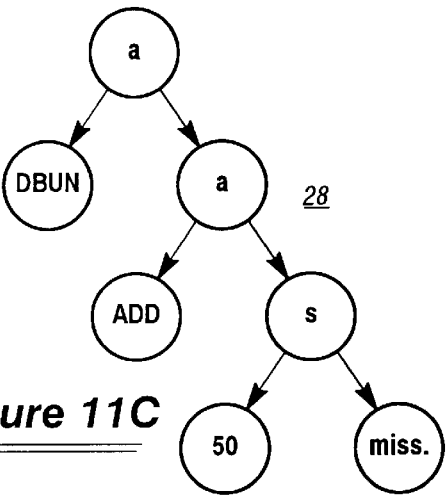
Figure 11B:
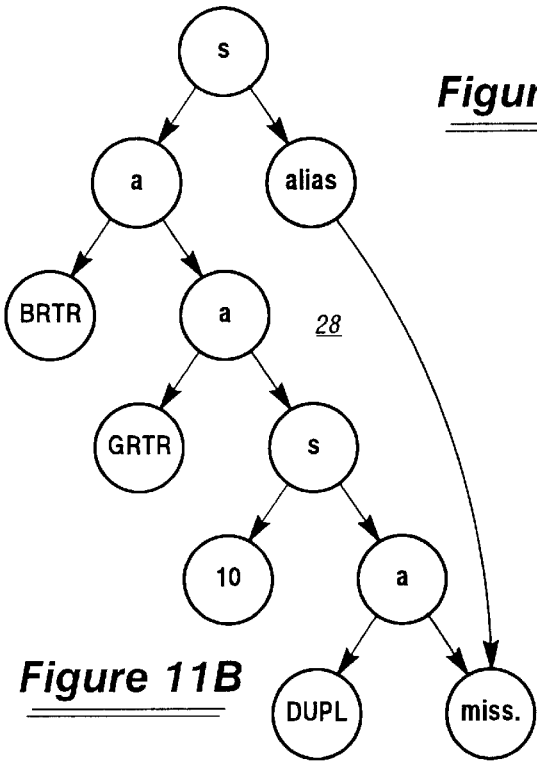

Presumably, in analyzing the program 20 having the above-specified blocks, the translator 10 will find the dynamic branch in block 3, and will eventually examine such dynamic branch in order to more fully define the CFG 26, as was discussed above. In doing so, the translator 10 will construct code graphs 28 for each of blocks 1–3 (among others), as is shown in FIGS. 11A–11C, respectively. The translator 10 will then analyze all appropriate code graphs 28 in an effort to define all possible values that can be provided to the DBUN instruction.

It may very well be the case that other blocks 24 also flow to the dynamic branch at issue in the present example. In such case, the translator will analyze such other blocks 24 as necessary. However, for simplicity sake, the present example will focus on blocks 1–3 only.

Here, and referring now to FIG. 14, the analysis by the translator 10 begins with noting that in the block having the dynamic branch (block 3), information about a needed value for calculating the branch address is supplied elsewhere (i.e., from a previous block in the flow of the program 20) or otherwise insufficiently defined (step 1401). Such information about the needed value is represented by the missing node at the bottom of FIG. 11C.

Figure 12:
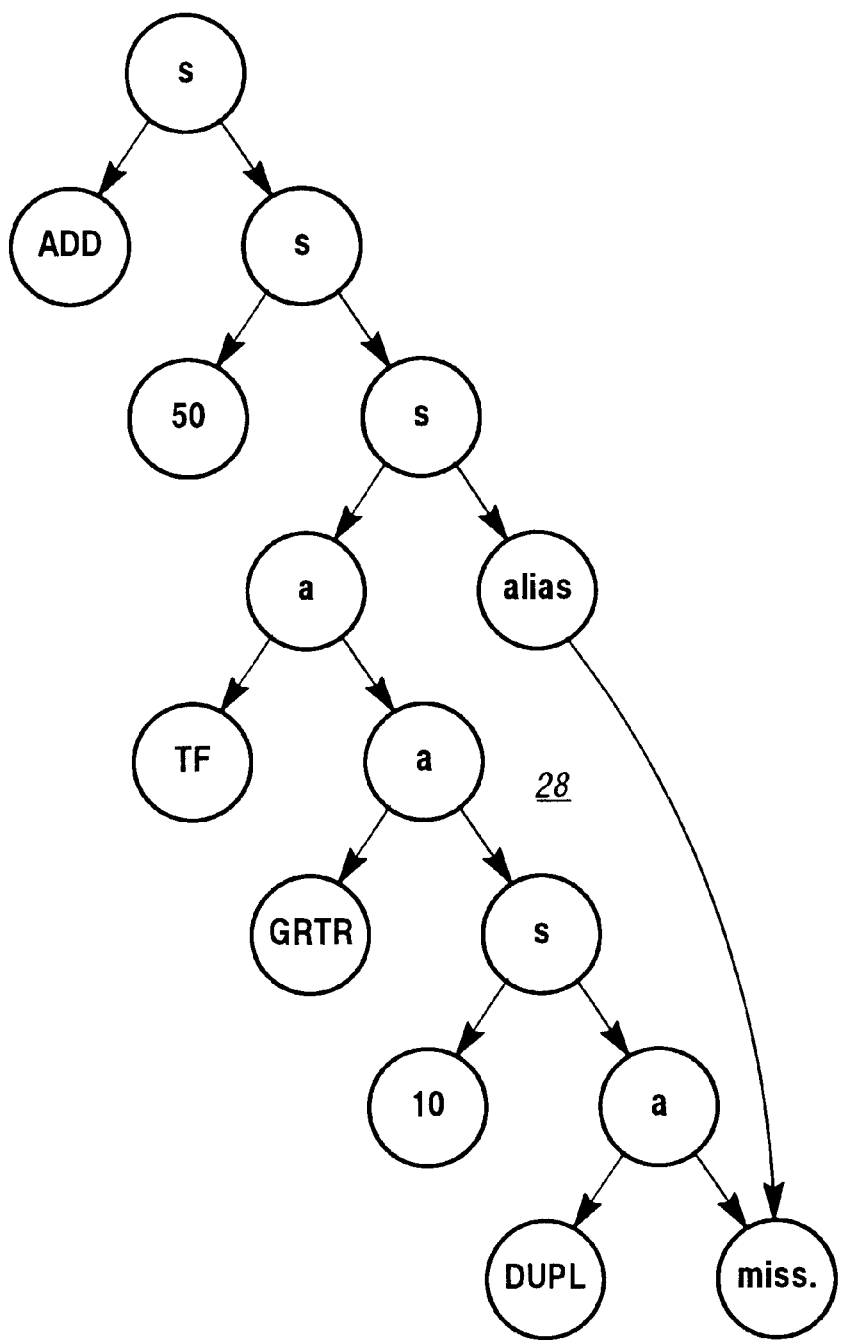
FIGS. 12 and 13 are diagrams showing new, combined code graphs constructed by the translator of FIG. 1 from the code graphs of FIGS. 11A–11C.

To obtain information on such missing node, the translator 10 looks to the immediately preceding block 24, which is block 2 as shown in FIG. 11B, as can be determined by reviewing the CFG 26 that includes block 3 (step 1403). In particular, the translator 10 constructs a new code graph 28 having the code graphs 28 for both blocks 3 and 2 (FIGS. 11C and 11B) (step 1405). As shown in FIG. 12, the translator 10 replaces the missing node at the bottom of the code graph 28 for block 3 (FIG. 11C) with the stack node at the top of the code graph 28 for block 2 (FIG. 11B), and all other nodes that flow from such stack node. In addition, the translator 10 locates and replaces the BRTR node in the code graph 28 for block 2 (FIG. 11B) with a test false (TF) node, on the assumption that GRTR in the same code graph 28 is false, thereby allowing the program 20 to fall through at BRTR in block 2 (steps 1407, 1409). Had the assumption been made that the program 20 branched at BRTR instead of falling through, a test true (TT) node would have been used instead. As should be understood, if the instruction were BRFL (branch on false), the converse would be true. As also seen, the DBUN node and the apply node that edges to the DBUN node are omitted as being of no use in the present analysis: the ultimate goal of the analysis is to find bounds information relating to the (now top-most) apply node which represents the argument applied to the DBUN instruction. The translator 10 then proceeds to traverse the new code graph 28 (step 1411).

The translator 10 will now note that in block 2, information about a needed value for calculating the branch address is still supplied elsewhere (i.e., from a previous block in the flow of the program 20). Such information about the needed value is once again represented by the missing node at the bottom of FIG. 11B, and now also at the bottom of FIG. 12. Importantly, although the translator 10 has not as yet defined the missing value, information is now available that at least narrows the range of such missing value: the missing value has to be less than 10. Otherwise, the program 20 could not fall through the GRTR instruction in block 2.

Figure 13:
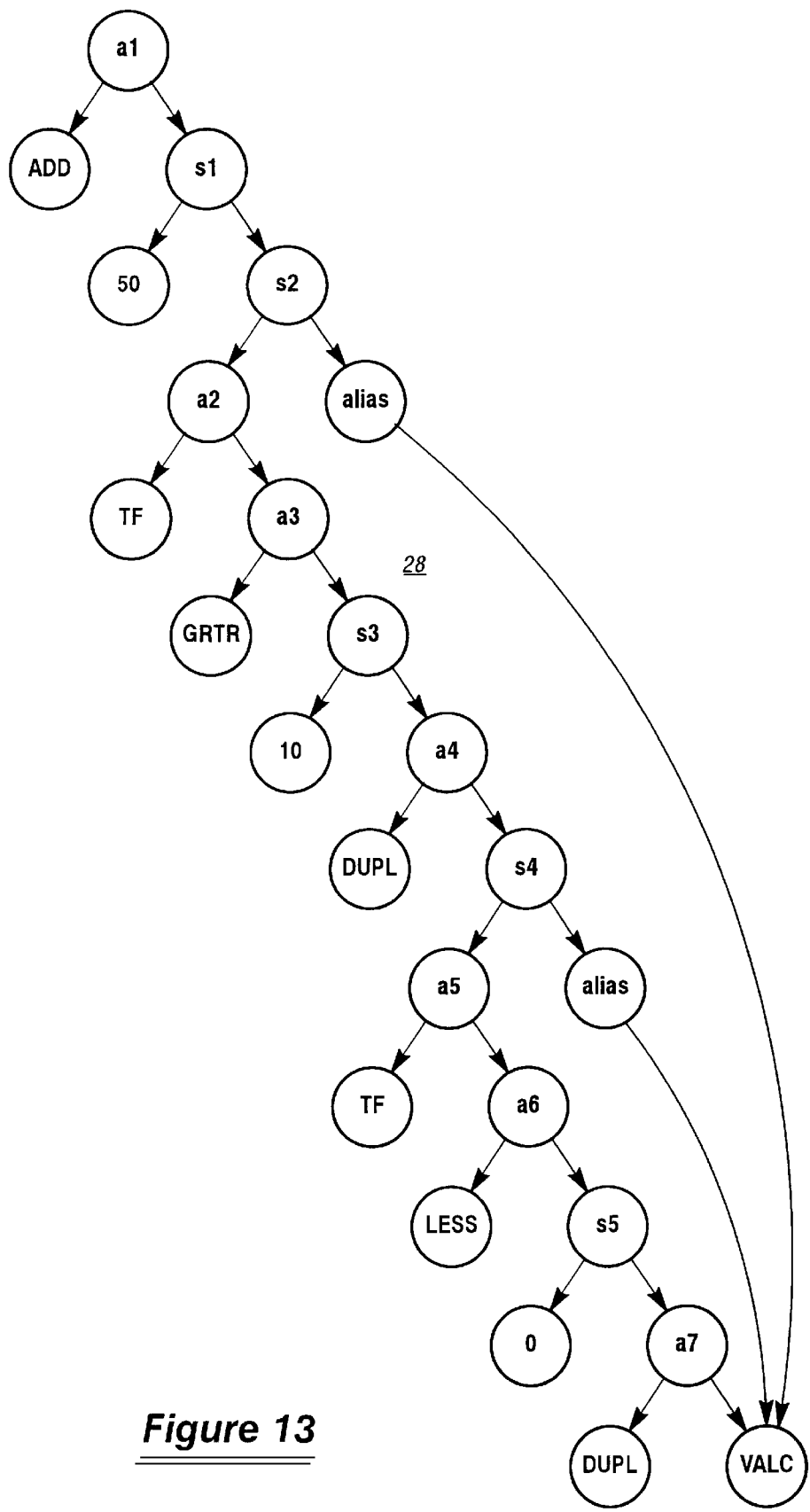

Since a missing node is still present at the bottom of the code graph 28 for blocks 3 and 2 (FIG. 12), the translator 10 once again looks to the immediately preceding block 24, which is block 1 as shown in FIG. 11A, as can once again be determined by reviewing the CFG 26 that includes blocks 3 and 2. In particular, the translator 10 once again constructs a new code graph 28 having the code graphs 28 for blocks 3, 2, and 1 (FIGS. 11C–11A). In particular, and as shown in FIG. 13, the translator 10 replaces the missing node at the bottom of the code graph 28 for blocks 3 and 2 (FIG. 12) with the stack node at the top of the code graph 28 for block 1 (FIG. 11A), and all other nodes that flow from such stack node. In addition, the translator 10 once again replaces the BRTR node in the code graph 28 for block 2 (FIG. 11B), again with a test false (TF) node, on the assumption that LESS in the same code graph 28 is false, thereby allowing the program 20 to fall through at BRTR in block 1. As also seen, the alias node from FIGS. 11B and 12 has been adjusted to edge to the VALC node from FIG. 11A, since the value aliased ultimately derives from such VALC node. Further, each alias and stack node has been individually identified for purposes of the description below.

Again, the translator 10 will note that in block 1, a needed value for calculating the branch address is still supplied elsewhere (i.e., from a previous block in the flow of the program 20). However, in this case, such needed value is represented by the VALC node at the bottom of FIG. 11C, and now also at the bottom of FIG. 13. Importantly, although the translator 10 has not as yet defined the needed value, additional information is now available that at least narrows the range of such needed value: such needed value has to be greater than 0. Otherwise, the program 20 could not fall through the GRTR instruction in block 1.

Moreover, now that the translator 10 knows that the needed value is greater than 0 and less than 10, the translator 10 needn't concern itself further with the exact value of the needed value. Thus, the distinction between 'needed value' and 'information about a needed value'. Put simply, it is enough to know that the needed value has a set upper bound and a set lower bound, at least according to the path represented by blocks 1–3. Significantly, this would be true even if the aforementioned VALC node were instead another missing node. Of course, if other paths exist, such other paths must be traversed by the translator 10, on the chance that such other paths will produce broader bounds.

Once the broadest bounds of the missing node at the bottom of the code graph 28 of block 3 have been defined, the translator 10 can calculate the range of addresses that can be presented to the dynamic branch (DBUN) in such block 3. In particular, if such missing node can take on values between 0 and 10, and since the literal value placed on the stack is 50, then, the ADD instruction will return a value between 50 and 60 on the stack. Such value between 50 and 60, then, is the range of addresses presented to the dynamic branch, and based on such information, the translator 10 can locate an associated branch table, and can thereby update the CFG 26 accordingly.

In doing so, it may very well be the case that previously unreachable blocks 24 are now reachable. Such now reachable blocks 24 are then marked as being live, of course. It might also be the case that such now live blocks 28 contain one or more dynamic branches, which must be analyzed by the translator 10.

While the present example has thus far been analyzed in narrative form, it is understood that the translator 10 employs an algorithm to effectuate the analysis, wherein the translator 10 (via the aforementioned props) attempts to push bounds information down a code graph 28 and also to propagate changes up such code graph 28. Preliminarily, it should be understood that such algorithm is performed on the code graph 28 for the block having the dynamic branch (block 3 in the example). If the results are inconclusive, the translator 10 reaches backward in the CFG 26 and analyzes combined code graphs 28 (such as those in FIGS. 12 and 13) until conclusive results are obtained. For the sake of clarity, though, the present analysis will focus only on the code graph 28 shown in FIG. 13.

Preliminarily, the translator 10 traverses toward the bottom of the code graph 28 to look for apply nodes whose instructions (i.e., below and to the left) are 'interesting'. Here, only test nodes are considered interesting. In doing so, the translator 10 notes the existence of the upper TF node and the lower TF node. The translator 10 then selects one of the interesting nodes for examination. Assuming the lower TF node is selected first, the translator 10 begins the examination of such lower TF node by recognizes that the apply node (a6) which is the argument to the TF node (i.e., to the right) must be false (0) to satisfy such TF node. The translator therefore attaches bounds information to a6 to the effect that a6 has an upper and lower bound of 0.

The translator 10 then recognizes that it must examine the instruction (the LESS below and to the left) and the argument (the 0 node and the a7 node dependent from the stack node s5 below and to the right) of a6. In doing so, the translator 10 recognizes that a7 must be greater than 0 to satisfy the LESS node. The translator 10 therefore attaches bounds information to a7 to the effect that a7 has a lower bound of 0 and an unknown upper bound.

Now, because the translator 10 recognizes that a7 is the application of the instruction DUPL (duplication) to the argument VALC (an un-defined value), the translator 10 further recognizes that the VALC must have the same node information as a7. The translator 10 therefore attaches bounds information to VALC to the effect that VALC has a lower bound of 0 and an unknown upper bound.

Next, the translator 10 recognizes that VALC is pointed to by the lower alias node, which leads from stack node s4 (as well as the upper alias node, which also leads from a stack node s2). Because the stack node s2 leads to an apply node a5 that is the result of a TF instruction, the translator recognizes that it can ignore a5 and that s4 must have the same node information as VALC. The translator therefore attaches bounds information to s4 to the effect that s4 has a lower bound of 0 and an unknown upper bound. For the same reasons, the translator 10 likewise attaches bounds information to s2 to the effect that s2 has a lower bound of 0 and an unknown upper bound.

The translator 10 then begins the examination of the upper TF node by recognizes that the apply node (a3) which is the argument to the TF node (i.e., to the right) must be false (0) to satisfy such TF node. The translator therefore attaches bounds information to a3 to the effect that a3 has an upper and lower bound of 0.

The translator 10 then recognizes that it must examine the instruction (the GRTR below and to the left) and the argument (the 10 node and the a4 node dependent from the stack node s3 below and to the right) of a3. In doing so, the translator 10 recognizes that a4 must be less than 10 to satisfy the GRTR node. The translator 10 therefore attaches bounds information to a4 to the effect that a4 has a upper bound of 10 and an unknown lower bound.

Now, because the translator 10 recognizes that a4 is the application of the instruction DUPL (duplication) to the stack node s4, the translator 10 further recognizes that s4 must have the same node information as a7. Moreover, since s4 already has bounds information (lower bound 0, upper bound unknown), the translator therefore updates the bounds information of s4 to the effect that s4 has a lower bound of 0 and an upper bound of 10.

Next, the translator 10 again recognizes that VALC is pointed to by the lower alias node which leads from s4, and that the upper alias node which leads from stack s2 also points to VALC. The translator 10 then recognizes that VALC, s2, and s4 must all have the same bounds information, and therefore updates the bounds information of s2 to the effect that s2 has a lower bound of 0 and an upper bound of 10.

The translator 10 then recognizes that it must examine the instruction (the ADD below and to the left) and the argument (the 50 node and the s2 node dependent from the stack node s3 below and to the right) of a1. In doing so, the translator 10 recognizes that the result of the ADD instruction will be whatever is represented by stack node s2 plus 50. Since s2 has a lower bound of 0 and an upper bound of 10, then, the translator 10 therefore attaches bounds information to a1 to the effect that a4 has a lower bound of 50 and an upper bound of 60.

Such a1 bounds of 50 and 60, then, is the range of addresses presented to the dynamic branch, and based on such information, the translator 10 can locate an associated branch table, and can thereby update the CFG 26 accordingly.

Note from the present example that if the translator 10 defines the bounds of a dynamic branch too narrowly, branch table information will be missed and the CFG 26 will be incomplete. However, if the translator 10 defines the bounds of a dynamic branch too broadly, branch table information will not be missed and the CFG 26 will not be incomplete. Instead, information adjacent a branch table may be misinterpreted as branch table information, and the CFG 26 may be updated with harmless garbage. Preferably, though, the translator 10 will recognize that such adjacent information does not look like part of a branch table, and will ignore such adjacent information.

Of course, many variations and short cuts exist. For example, if the path back from a first dynamic branch leads to a second dynamic branch, such second dynamic branch is preferably replaced by the translator 10 in a new code graph (a la FIGS. 12 or 13) with a test index node having the value necessary to fall through toward the first dynamic branch.

If the translator 10 encounters a needed value and knows that the needed value is, for example, four bits wide (0–15), the translator 10 may forego code graph analysis, and instead assume that the needed value is between 0 and 15.

If the translator 10 encounters a procedure call in traversing a code graph 28, uncertainty arises because such procedure call may return either one result or none on the stack. The procedure call cannot be followed because its location cannot be determined until run time. In this case, if nothing further is known about what the procedure call returns, the translator 10 preferably examines the effect of both cases (zero or one result on stack), compares the effects, and chooses whatever is consistent with context. Oftentimes, the choice will be clear.

On occasion, the translator 10 will encounter a dynamic branch without any associated bounding and offsetting code. Instead, the dynamic branch will be flowed to from several different blocks 24, each of which merely stores a predefined address value on the stack for the dynamic branch to operate on. In such a case, the translator preferably is aware that it has likely encountered a finite state machine. In such machine, the dynamic branch does not go to a branch table, but directly to several other blocks 24 each of which is likely part of such machine. The translator 10, then, need only traverse the code graphs 28 of all the paths leading to the dynamic branch to the extent necessary to obtain the universe of specific addresses that can be operated on by such dynamic branch.

In the foregoing description, it can be seen that the present invention comprises a new and useful method and translator for translating compiled programming code from a first code state to a second code state. It should be appreciated that changes could be made to the embodiments described above without departing from the inventive concepts thereof. It is understood, therefore, that this invention is not limited to the particular embodiments disclosed, but it is intended to cover modifications within the spirit and scope of the present invention as defined by the appended claims.

What is claimed:

1. A method of translating compiled programming code from a first code state to a second code state, the programming code in the first code state comprising a plurality of basic blocks, each basic block comprising a set of instructions, at least one basic block ending in a dynamic branch, the dynamic branch being a transfer to one of a set of destinations based on a calculation of a destination address, the method comprising the steps of:

identifying the plurality of basic blocks in the first code state of the programming code;

identifying links between the identified basic blocks;

constructing a control flow graph/representation (CFG) of the programming code based on the identified basic blocks and identified links, the CFG being in a preliminary form;

identifying at least one basic block ending in a dynamic branch;

exploring, based on the CFG, all identified basic blocks that lead to the dynamic branch as far back as is necessary to fully determine a set of destination addresses for the dynamic branch, the set of destination addresses defining the set of destinations from the dynamic branch, wherein the exploring step includes the substeps of:

(a). for each explored basic block, constructing a corresponding code graph/representation (code graph) of the instructions in such basic block, wherein each code graph is a rooted directed acyclic graph having interconnected nodes, and each node being one of:

an instruction node representing an instruction in the corresponding basic block;

an argument node representing an argument in the corresponding basic block;

an apply node edging to an instruction node and to an argument node and representing the application of such argument node to such instruction node, the apply node in certain instances also being an argument node edged to by another node;

a stack node edging to a pair of argument nodes and acting as an argument node having the pair of argument nodes;

a missing argument node representing a missing argument supplied from a different basic block; and, an alias node edged to by a stack node or apply node and edging to an argument remote from such stack node, and representing such remote argument to such stack node;

(b). noting that a first code graph corresponding to a first basic block contains a missing/insufficiently defined argument node;

(c). locating, based on the CFG, a second basic block that immediately precedes the first basic block, a second code graph corresponding to the second basic block;

(d). constructing a new code graph having the first code graph and the second code graph by replacing the missing argument node in the first code graph with the second code graph; and, (e). traversing each code graph including the new code graph to determine the set of destination addresses from the dynamic branch;

examining the set of destinations to identify a branch table;

updating the CFG to reflect the set of destinations and the identified branch table;

and, translating the programming code from the first code state to the second code state based at least in part on the updated CFG.

2. The method of claim 1 wherein the exploring step comprises the steps of:

locating, in the portion of the new code graph corresponding to the second code graph, an instruction node representing a condition that must be satisfied to allow program flow to continue from the second basic block to the first basic block; and replacing the located instruction node with a test node indicative of the condition that must be satisfied.

3. The method of claim 2 wherein the located instruction node is representative of a branch instruction, and the condition that must be satisfied is a logical true, a logical false, or a pre-determined index value.

4. The method of claim 2 wherein the exploring step comprises the step of performing bounds evaluation according to a list of props, each prop indicating a target node to which such prop applies and a set of bounds that are to be applied to such node.

5. The method of claim 4 wherein the step of performing bounds evaluation comprises the step of traversing each node in the code graph for each prop in the list.

6. The method of claim 5 wherein the step of traversing each node comprises, for each prop, the step of attempting to push bounds information into the argument node edged to from an apply node if such apply node is being traversed and is the target node of the prop.

7. The method of claim 6 wherein each node includes bounds information, and wherein the attempting step comprises the steps of:

attempting to deduce bounds information for the argument node edged to from the target apply node based on such argument node and the instruction node edged to from such target apply node;

if appropriate, altering the bounds information of the argument node edged to from the target apply node; and adding a new prop to the list if the bounds information of the argument node edged to from the target apply node is altered.

8. The method of claim 4 wherein the step of traversing each node comprises creating a prop for the argument of each test node the first time the test node is encountered.

9. The method of claim 8 wherein the step of traversing each node comprises preliminarily traversing the code graph with an empty prop the purpose of accumulating props for test nodes.

10. The method of claim 9 wherein each node includes bounds information, and wherein the step of traversing each node comprises stepping through the code graph in a spanning direction, and then re-tracing through the code graph opposite the spanning direction, the re-tracing step including the step of re-evaluating the bounds information of each re-traced node whenever a change in bounds may result.

11. A translator operating on a processor for translating compiled programming code from a first code state to a second code state, the programming code in the first code state comprising a plurality of basic blocks, each basic block comprising a set of instructions, at least one basic block ending in a dynamic branch, the dynamic branch being a transfer to one of a set of destinations based on a calculation of a destination address, the translator:

identifying the plurality of basic blocks in the first code state of the programming code;

identifying links between the identified basic blocks;

constructing a control flow graph/representation (CFG) of the programming code based on the identified basic blocks and identified links, the CFG being in a preliminary form;

identifying at least one basic block ending in a dynamic branch;

exploring, based on the CFG, all identified basic blocks that lead to the dynamic branch as far back as is necessary to fully determine a set of destination addresses for the dynamic branch, the set of destination addresses defining the set of destinations from the dynamic branch;

constructing a corresponding code graph/representation (code graph) of the instructions in such basic block for each explored block, wherein each code graph is a rooted directed acyclic graph having interconnected nodes, each node being one of:

an instruction node representing an instruction in the corresponding basic block;

an argument node representing an argument in the corresponding basic block;

an apply node edging to an instruction node and to an argument node and representing the application of such argument node to such instruction node, the apply node in certain instances also being an argument node edged to by another node;

a stack node edging to a pair of argument nodes and acting as an argument node having the pair of argument nodes;

a missing argument node representing a missing argument supplied from a different basic block; and, an alias node edged to by a stack node or apply node and edging to an argument remote from such stack node, and representing such remote argument to such stack node;

noting that a first code graph corresponding to a first basic block contains a missing/insufficiently defined argument node;

locating, based on the CFG, a second basic block that immediately precedes the first basic block, a second code graph corresponding to the second basic block;

constructing a new code graph having the first code graph and the second code graph by replacing the missing argument node in the first code graph with the second code graph; and, traversing each code graph including the new code graph in an effort to determine the set of destination addresses from the dynamic branch;

examining the set of destinations to identify a branch table;

updating the CFG to reflect the set of destinations and the identified branch table; and, translating the programming code from the first code state to the second code state based at least in part on the updated CFG.

12. The translator of claim 11 wherein the translator:
locates, in the portion of the new code graph corresponding to the second code graph, an instruction node representing a condition that must be satisfied to allow program flow to continue from the second basic block to the first basic block; and
replaces the located instruction node with a test node indicative of the condition that must be satisfied.

13. The translator of claim 12 wherein the located instruction node is representative of a branch instruction, and the condition that must be satisfied is a logical true, a logical false, or a pre-determined index value.

14. The translator of claim 12 wherein the translator performs bounds evaluation according to a list of props, each prop indicating a target node to which such prop applies and a set of bounds that are to be applied to such node.

15. The translator of claim 14 wherein the translator traverses each node in the code graph for each prop in the list.

16. The translator of claim 15 wherein the translator, for each prop, attempts to push bounds information into the argument node edged to from an apply node if such apply node is being traversed and is the target node of the prop.

17. The translator of claim 16 wherein each node includes bounds information, and wherein the translator:
attempts to deduce bounds information for the argument node edged to from the target apply node based on such argument node and the instruction node edged to from such target apply node;
if appropriate, alters the bounds information of the argument node edged to from the target apply node; and
adds a new prop to the list if the bounds information of the argument node edged to from the target apply node is altered.

18. The translator of claim 14 wherein the translator creates a prop for the argument of each test node the first time the test node is encountered.

19. The translator of claim 18 wherein the translator preliminarily traverses the code graph with an empty prop the purpose of accumulating props for test nodes.

20. The translator of claim 19 wherein each node includes bounds information, and wherein the translator steps through the code graph in a spanning direction, and then re-traces through the code graph opposite the spanning direction, the re-tracing including re-evaluation of the bounds information of each re-traced node whenever a change in bounds may result.

21. In connection with translating compiled programming code from a first code state to a second code state, the programming code in the first code state comprising a plurality of basic blocks, each basic block comprising a set of instructions, at least one basic block ending in a dynamic branch, the dynamic branch being a transfer to one of a set of destinations based on a calculation of a destination address, a computer-readable medium having computer-executable instructions for performing steps comprising:
identifying the plurality of basic blocks in the first code state of the programming code;
identifying links between the identified basic blocks;
constructing a control flow graph/representation (CFG) of the programming code based on the identified basic blocks and identified links, the CFG being in a preliminary form;
identifying at least one basic block ending in a dynamic branch;
exploring, based on the CFG, all identified basic blocks that lead to the dynamic branch as far back as is necessary to fully determine a set of destination addresses for the dynamic branch, the set of destination addresses defining the set of destinations from the dynamic branch, wherein the exploring step includes the substeps of:
(a). for each explored basic block, constructing a corresponding code graph/representation (code graph) of the instructions in such basic block, wherein each code graph is a rooted directed acyclic graph having interconnected nodes, each node being one of:
an instruction node representing an instruction in the corresponding basic block;
an argument node representing an argument in the corresponding basic block;
an apply node edging to an instruction node and to an argument node and representing the application of such argument node to such instruction node, the apply node in certain instances also being an argument node edged to by another node;
a stack node edging to a pair of argument nodes and acting as an argument node having the pair of argument nodes;
a missing argument node representing a missing argument supplied from a different basic block; and,
an alias node edged to by a stack node or apply node and edging to an argument remote from such stack node, and representing such remote argument to such stack node.
(b). noting that a first code graph corresponding to a first basic block contains a missing/insufficiently defined argument node;
(c). locating, based on the CFG, a second basic block that immediately precedes the first basic block, a second code graph corresponding to the second basic block;
(d). constructing a new code graph having the first code graph and the second code graph by replacing the missing argument node in the first code graph with the second code graph; and,
(e). traversing each code graph including the new code graph in an effort to determine the set of destination addresses from the dynamic branch;
examining the set of destinations to identify a branch table;
updating the CFG to reflect the set of destinations and the identified branch table; and,
translating the programming code from the first code state to the second code state based at least in part on the updated CFG.

22. The computer-readable medium of claim 21 wherein the exploring step comprises the steps of:
locating, in the portion of the new code graph corresponding to the second code graph, an instruction node representing a condition that must be satisfied to allow program flow to continue from the second basic block to the first basic block; and
replacing the located instruction node with a test node indicative of the condition that must be satisfied.

23. The computer-readable medium of claim 22 wherein the located instruction node is representative of a branch instruction, and the condition that must be satisfied is a logical true, a logical false, or a pre-determined index value.

24. The computer-readable medium of claim 22 wherein the exploring step comprises the step of performing bounds evaluation according to a list of props, each prop indicating a target node to which such prop applies and a set of bounds that are to be applied to such node.

25. The computer-readable medium of claim 24 wherein the step of performing bounds evaluation comprises the step of traversing each node in the code graph for each prop in the list.

26. The computer-readable medium of claim 25 wherein the step of traversing each node comprises, for each prop, the step of attempting to push bounds information into the argument node edged to from an apply node if such apply node is being traversed and is the target node of the prop.

27. The computer-readable medium of claim 26 wherein each node includes bounds information, and wherein the attempting step comprises the steps of:

attempting to deduce bounds information for the argument node edged to from the target apply node based on such argument node and the instruction node edged to from such target apply node;

if appropriate, altering the bounds information of the argument node edged to from the target apply node; and adding a new prop to the list if the bounds information of the argument node edged to from the target apply node is altered.

28. The computer-readable medium of claim 24 wherein the step of traversing each node comprises creating a prop for the argument of each test node the first time the test node is encountered.

29. The computer-readable medium of claim 28 wherein the step of traversing each node comprises preliminarily traversing the code graph with an empty prop the purpose of accumulating props for test nodes.

30. The computer-readable medium of claim 29 wherein each node includes bounds information, and wherein the step of traversing each node comprises stepping through the code graph in a spanning direction, and then re-tracing through the code graph opposite the spanning direction, the re-tracing step including the step of re-evaluating the bounds information of each re-traced node whenever a change in bounds may result.

\* \* \* \* \*